United States Patent
Abdelghaffar et al.

(10) Patent No.: US 12,445,886 B2
(45) Date of Patent: Oct. 14, 2025

(54) CROSS-LINK INTERFERENCE MEASUREMENT AND REPORTING IN A MULTIPLE TRANSMISSION AND RECEPTION POINT SYSTEM

(71) Applicant: QUALCOMM Incorporated, San Diego, CA (US)

(72) Inventors: Muhammad Sayed Khairy Abdelghaffar, San Jose, CA (US); Huilin Xu, Temecula, CA (US); Abdelrahman Mohamed Ahmed Mohamed Ibrahim, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 377 days.

(21) Appl. No.: 17/828,944

(22) Filed: May 31, 2022

(65) Prior Publication Data

US 2023/0388838 A1    Nov. 30, 2023

(51) Int. Cl.
*H04W 24/10* (2009.01)
*H04B 17/336* (2015.01)
*H04W 16/28* (2009.01)

(52) U.S. Cl.
CPC .......... *H04W 24/10* (2013.01); *H04B 17/336* (2015.01); *H04W 16/28* (2013.01)

(58) Field of Classification Search
None
See application file for complete search history.

(56) References Cited

U.S. PATENT DOCUMENTS 12,149,969 B2 * 11/2024 Zhang ................... H04W 24/08
2019/0260486 A1 * 8/2019 Kang .................... H04L 5/0007
(Continued)

FOREIGN PATENT DOCUMENTS

WO     WO-2022056822 A1    3/2022

OTHER PUBLICATIONS

Intel Corporation: "UE-to-UE CLI Measurement and Reporting", 3GPP TSG RAN WG1 Ad-Hoc Meeting 1901, R1-1900489, 3rd Generation Partnership Project, Mobile Competence Centre, 650, Route Des Lucioles, F-06921 Sophia-Antipolis Cedex, France, vol. RAN WG1, No. Taipei, Jan. 21-Jan. 25, 2019, Jan. 20, 2019, XP051593402, 5 Pages, 3.3 L3 CLI Measurement and reporting configuration, p. 2-p. 4.

(Continued)

*Primary Examiner* — Xavier S Wong
(74) *Attorney, Agent, or Firm* — Holland & Hart LLP

(57) ABSTRACT

Methods, systems, and devices for wireless communications are described. A user equipment (UE) may receive a message indicating a configuration for measurement of cross-link interference associated with the UE. The configuration may indicate one or more TCI states for the UE to use for performing one or more cross-link interference measurements. The UE may perform the one or more cross-link interference measurements in accordance with the configuration. The UE may perform the one or more cross-link interference measurements over a set of cross-link interference resources using the one or more TCI states. The UE may transmit a cross-link interference report indicating one or more cross-link interference metrics corresponding to the one or more cross-link interference measurements.

30 Claims, 21 Drawing Sheets

(56) References Cited

U.S. PATENT DOCUMENTS

| | | | |
|---|---|---|---|
| 2020/0228213 A1* | 7/2020 | Masal | H04L 5/14 |
| 2021/0250797 A1* | 8/2021 | Karjalainen | H04L 1/0026 |
| 2021/0289374 A1 | 9/2021 | Zhang et al. | |
| 2021/0351832 A1* | 11/2021 | Zhang | H04L 5/1461 |
| 2022/0210667 A1* | 6/2022 | Fan | H04W 72/23 |
| 2023/0254870 A1* | 8/2023 | Khoshnevisan | H04L 5/0091 370/329 |
| 2024/0129772 A1* | 4/2024 | Laddu | H04B 7/022 |

OTHER PUBLICATIONS

International Search Report and Written Opinion—PCT/US2023/066989—ISA/EPO—Aug. 16, 2023 (2201599WO).

* cited by examiner

CROSS-LINK INTERFERENCE MEASUREMENT AND REPORTING IN A MULTIPLE TRANSMISSION AND RECEPTION POINT SYSTEM

FIELD OF TECHNOLOGY

The following relates to wireless communications, including cross-link interference measurement and reporting in a multiple transmission and reception point (TRP) system.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities, each supporting wireless communication for communication devices, which may be known as user equipment (UE). In some wireless communications systems, communication devices may transmit or receive communications concurrently or overlapping in time, which may lead to cross-link interference experienced by one or more communication devices.

SUMMARY

The described techniques relate to improved methods, systems, devices, and apparatuses that support cross-link interference measurement and reporting in a multiple transmission and reception point (TRP) system. For example, the described techniques provide for configuration of a communication device, such as a user equipment (UE), with one or more transmission configuration indicator (TCI) states for cross-link interference measurement and reporting. In some examples, a UE may receive a message indicating a configuration for measurement of cross-link interference associated with the UE. The configuration may indicate one or more TCI states for the UE to use for performing one or more cross-link interference measurements. In some examples, the UE may perform the one or more cross-link interference measurements in accordance with the configuration. For example, the UE may perform the one or more cross-link interference measurements over a set of cross-link interference resources using the one or more TCI states. In some examples, the UE may transmit a cross-link interference report indicating one or more cross-link interference metrics corresponding to the one or more cross-link interference measurements. Such techniques may increase the reliability of wireless communications between the UE and the network, among other benefits.

A method for wireless communication at a UE is described. The method may include receiving a message indicating a configuration for measurement of cross-link interference associated with the UE, the configuration indicating one or more TCI states for the UE to use for performing one or more cross-link interference measurements, performing the one or more cross-link interference measurements over a set of cross-link interference resources using the one or more TCI states in accordance with the configuration, and transmitting a cross-link interference report indicating one or more cross-link interference metrics corresponding to the one or more cross-link interference measurements.

An apparatus for wireless communication at a UE is described. The apparatus may include a processor, memory coupled with the processor, and instructions stored in the memory. The instructions may be executable by the processor to cause the apparatus to receive a message indicating a configuration for measurement of cross-link interference associated with the UE, the configuration indicating one or more TCI states for the UE to use for performing one or more cross-link interference measurements, perform the one or more cross-link interference measurements over a set of cross-link interference resources using the one or more TCI states in accordance with the configuration, and transmit a cross-link interference report indicating one or more cross-link interference metrics corresponding to the one or more cross-link interference measurements.

Another apparatus for wireless communication at a UE is described. The apparatus may include means for receiving a message indicating a configuration for measurement of cross-link interference associated with the UE, the configuration indicating one or more TCI states for the UE to use for performing one or more cross-link interference measurements, means for performing the one or more cross-link interference measurements over a set of cross-link interference resources using the one or more TCI states in accordance with the configuration, and means for transmitting a cross-link interference report indicating one or more cross-link interference metrics corresponding to the one or more cross-link interference measurements.

A non-transitory computer-readable medium storing code for wireless communication at a UE is described. The code may include instructions executable by a processor to receive a message indicating a configuration for measurement of cross-link interference associated with the UE, the configuration indicating one or more TCI states for the UE to use for performing one or more cross-link interference measurements, perform the one or more cross-link interference measurements over a set of cross-link interference resources using the one or more TCI states in accordance with the configuration, and transmit a cross-link interference report indicating one or more cross-link interference metrics corresponding to the one or more cross-link interference measurements.

In some examples of the method, apparatuses, and non-transitory computer-readable medium described herein, receiving the message indicating the configuration for the measurement of the cross-link interference may include operations, features, means, or instructions for receiving a control message indicating one or more cross-link interference resources of the set of cross-link interference resources and one or more control resource sets associated with the one or more cross-link interference resources, where each control resource set of the one or more control resource sets corresponds to a TCI state of the one or more TCI states, and where the control message includes the message.

In some examples of the method, apparatuses, and non-transitory computer-readable medium described herein, receiving the message indicating the configuration for the measurement of the cross-link interference may include operations, features, means, or instructions for receiving a control message via a control resource set, the control message indicating one or more resources for a shared channel message for the UE, where one or both of the control resource set or the shared channel message may be associated with two TCI states, and where the one or more cross-link interference measurements may be performed based on at least one TCI state of the two TCI states.

In some examples of the method, apparatuses, and non-transitory computer-readable medium described herein, performing the one or more cross-link interference measurements may include operations, features, means, or instructions for performing the one or more cross-link interference measurements based on a single quasi co-location relationship associated with the at least one TCI state of the two TCI states.

In some examples of the method, apparatuses, and non-transitory computer-readable medium described herein, performing the one or more cross-link interference measurements may include operations, features, means, or instructions for performing the one or more cross-link interference measurements based on a quasi co-location relationship associated with a TCI state of the at least one TCI state, the TCI state corresponding to a lowest TCI state identifier or a highest TCI state identifier of the at least one TCI state.

In some examples of the method, apparatuses, and non-transitory computer-readable medium described herein, performing the one or more cross-link interference measurements may include operations, features, means, or instructions for performing a first one or more cross-link interference measurements based on a first quasi co-location relationship associated with a first TCI state of the at least one TCI state over a first one or more cross-link interference resources of the set of cross-link interference resources and a second one or more cross-link interference measurements based on a second quasi co-location relationship associated with a second TCI state of the at least one TCI state over a second one or more cross-link interference resources of the set of cross-link interference resources.

In some examples of the method, apparatuses, and non-transitory computer-readable medium described herein, performing the one or more cross-link interference measurements may include operations, features, means, or instructions for performing the one or more cross-link interference measurements based on two quasi co-location relationships, where each of the two quasi co-location relationships may be associated with a respective one of the at least one TCI state of the two TCI states.

In some examples of the method, apparatuses, and non-transitory computer-readable medium described herein, the configuration includes an indication of one or more time offsets for performing the one or more cross-link interference measurements, the one or more time offsets being associated with the one or more TCI states.

In some examples of the method, apparatuses, and non-transitory computer-readable medium described herein, the one or more time offsets may be associated with two TCI states of the one or more TCI states and the one or more time offsets include a metric based on a maximum timing advance value, a minimum timing advanced value, or an average timing advance value.

In some examples of the method, apparatuses, and non-transitory computer-readable medium described herein, performing the one or more cross-link interference measurements may include operations, features, means, or instructions for performing the one or more cross-link interference measurements based on a first quasi co-location relationship associated with a first TCI state of the one or more TCI states and a second TCI state of the one or more TCI states, where the first TCI state corresponds to a first beam and the second TCI state corresponds to a second beam and generating a single cross-link interference metric based on the one or more cross-link interference measurements, where the cross-link interference report indicates the single cross-link interference metric.

In some examples of the method, apparatuses, and non-transitory computer-readable medium described herein, performing the one or more cross-link interference measurements may include operations, features, means, or instructions for performing a first one or more cross-link interference measurements over a first one or more cross-link interference resources of the set of cross-link interference resources based on a first quasi co-location relationship associated with a first TCI state of the one or more TCI states and a second one or more cross-link interference measurements over a second one or more cross-link interference resources of the set of cross-link interference resources based on a second quasi co-location relationship associated with a second TCI state of the one or more TCI states, where the first TCI state corresponds to a first beam and the second TCI state corresponds to a second beam, and where the first one or more cross-link interference measurements and the second one or more cross-link interference measurements may be each performed with both the first beam and the second beam and generating a first two cross-link interference metrics based on the first one or more cross-link interference measurements and a second two cross-link interference metrics based on the second one or more cross-link interference measurements, where one of the first two cross-link interference metrics and one of the second two cross-link interference metrics correspond to the first beam and the second beam.

In some examples of the method, apparatuses, and non-transitory computer-readable medium described herein, transmitting the cross-link interference report may include operations, features, means, or instructions for transmitting the cross-link interference report, where the cross-link interference report indicates one of the first two cross-link interference metrics and one of the second two cross-link interference metrics, both of the first two cross-link interference metrics and both of the second two cross-link interference metrics, an average of one of the first two cross-link interference metrics and one of the second two cross-link interference metrics, or an average of the first two cross-link interference metrics and the second two cross-link interference metrics.

Some examples of the method, apparatuses, and non-transitory computer-readable medium described herein may further include operations, features, means, or instructions for comparing each of the first two cross-link interference metrics and each of the second two cross-link interference metrics to a threshold and dropping a first one of the first two cross-link interference metrics and a first one of the second two cross-link interference metrics based on determining that the first one of the first two cross-link interference metrics and the first one of the second two cross-link interference metrics fail to satisfy the threshold, where the cross-link interference report indicates a second one of the first two cross-link interference metrics and a second one of the second two cross-link interference metrics or an average of the second one of the first two cross-link interference metrics and the second one of the second two cross-link interference metrics.

Some examples of the method, apparatuses, and non-transitory computer-readable medium described herein may further include operations, features, means, or instructions for determining an order of the first two cross-link interference metrics and the second two cross-link interference metrics based on a TCI state order of the first TCI state and the second TCI state, a control resource set order associated with each of the first TCI state and the second TCI state, or a value corresponding to each of the first two cross-link interference metrics and each of the second two cross-link interference metrics, where the cross-link interference report includes an indication of the order.

In some examples of the method, apparatuses, and non-transitory computer-readable medium described herein, transmitting the cross-link interference report may include operations, features, means, or instructions for filtering the first two cross-link interference metrics and the second two cross-link interference metrics and transmitting the cross-link interference report, where the cross-link interference report indicates the first two cross-link interference metrics, the second two cross-link interference metrics, a linear average of the first two cross-link interference metrics and the second two cross-link interference metrics, a filtered average of the first two cross-link interference metrics and the second two cross-link interference metrics, or both a linear average and filtered average of the first two cross-link interference metrics and the second two cross-link interference metrics.

In some examples of the method, apparatuses, and non-transitory computer-readable medium described herein, the cross-link interference report indicates the first two cross-link interference metrics based on a value associated with the first two cross-link interference metrics being greater than a value associated with the second two cross-link interference metrics.

In some examples of the method, apparatuses, and non-transitory computer-readable medium described herein, filtering the first two cross-link interference metrics and the second two cross-link interference metrics may include operations, features, means, or instructions for filtering the first two cross-link interference metrics and the second two cross-link interference metrics using a first filtering coefficient for the first two cross-link interference metrics and a second filtering coefficient for the second two cross-link interference metrics or a third filtering coefficient for both the first two cross-link interference metrics and the second two cross-link interference metrics.

Some examples of the method, apparatuses, and non-transitory computer-readable medium described herein may further include operations, features, means, or instructions for transmitting an indication of a UE capability associated with performing the one or more cross-link interference measurements, where the set of cross-link interference resources may be based on the UE capability.

A method for wireless communication at a network entity is described. The method may include transmitting a message indicating a configuration for measurement of cross-link interference associated with a UE, the configuration indicating one or more TCI states for performing one or more cross-link interference measurements over a set of cross-link interference resources using the one or more TCI states in accordance with the configuration and receiving a cross-link interference report indicating one or more cross-link interference metrics corresponding to the one or more cross-link interference measurements.

An apparatus for wireless communication at a network entity is described. The apparatus may include a processor, memory coupled with the processor, and instructions stored in the memory. The instructions may be executable by the processor to cause the apparatus to transmit a message indicating a configuration for measurement of cross-link interference associated with a UE, the configuration indicating one or more TCI states for performing one or more cross-link interference measurements over a set of cross-link interference resources using the one or more TCI states in accordance with the configuration and receive a cross-link interference report indicating one or more cross-link interference metrics corresponding to the one or more cross-link interference measurements.

Another apparatus for wireless communication at a network entity is described. The apparatus may include means for transmitting a message indicating a configuration for measurement of cross-link interference associated with a UE, the configuration indicating one or more TCI states for performing one or more cross-link interference measurements over a set of cross-link interference resources using the one or more TCI states in accordance with the configuration and means for receiving a cross-link interference report indicating one or more cross-link interference metrics corresponding to the one or more cross-link interference measurements.

A non-transitory computer-readable medium storing code for wireless communication at a network entity is described. The code may include instructions executable by a processor to transmit a message indicating a configuration for measurement of cross-link interference associated with a UE, the configuration indicating one or more TCI states for performing one or more cross-link interference measurements over a set of cross-link interference resources using the one or more TCI states in accordance with the configuration and receive a cross-link interference report indicating one or more cross-link interference metrics corresponding to the one or more cross-link interference measurements.

In some examples of the method, apparatuses, and non-transitory computer-readable medium described herein, transmitting the message indicating the configuration for the measurement of the cross-link interference may include operations, features, means, or instructions for transmitting a control message indicating one or more cross-link interference resources of the set of cross-link interference resources and one or more control resource sets associated with the one or more cross-link interference resources, where each control resource set of the one or more control resource sets corresponds to a TCI state of the one or more TCI states, and where the control message includes the message.

In some examples of the method, apparatuses, and non-transitory computer-readable medium described herein, transmitting the message indicating the configuration for the measurement of the cross-link interference may include operations, features, means, or instructions for transmitting a control message via a control resource set, the control message indicating one or more resources for a shared channel message, where one or both of the control resource set or the shared channel message may be associated with two TCI states.

In some examples of the method, apparatuses, and non-transitory computer-readable medium described herein, the configuration includes an indication of one or more time offsets for performing the one or more cross-link interference measurements, the one or more time offsets being associated with the one or more TCI states.

In some examples of the method, apparatuses, and non-transitory computer-readable medium described herein, the one or more time offsets may be associated with two TCI states of the one or more TCI states and the one or more time offsets include a metric based on a maximum timing advance value, a minimum timing advanced value, or an average timing advance value.

In some examples of the method, apparatuses, and non-transitory computer-readable medium described herein, receiving the cross-link interference report may include operations, features, means, or instructions for receiving the cross-link interference report, where the cross-link interference report indicates at least one of a first two cross-link interference metrics based on a first one or more cross-link interference measurements and a second two cross-link interference metrics based on a second one or more cross-link interference measurements, the first one or more cross-link interference measurements may be associated with a first TCI state of the one or more TCI states and the second one or more cross-link interference measurements may be associated with a second TCI state of the one or more TCI states, where the first TCI state corresponds to a first beam and the second TCI state corresponds to a second beam, and where the first one or more cross-link interference measurements and the second one or more cross-link interference measurements may be based on both the first beam and the second beam.

In some examples of the method, apparatuses, and non-transitory computer-readable medium described herein, the cross-link interference report indicates one of the first two cross-link interference metrics and one of the second two cross-link interference metrics, both of the first two cross-link interference metrics and both of the second two cross-link interference metrics, an average of one of the first two cross-link interference metrics and one of the second two cross-link interference metrics, or an average of the first two cross-link interference metrics and the second two cross-link interference metrics.

In some examples of the method, apparatuses, and non-transitory computer-readable medium described herein, the cross-link interference report indicates the first two cross-link interference metrics, the second two cross-link interference metrics, a linear average of the first two cross-link interference metrics and the second two cross-link interference metrics, a filtered average of the first two cross-link interference metrics and the second two cross-link interference metrics, or both a linear average and filtered average of the first two cross-link interference metrics and the second two cross-link interference metrics.

In some examples of the method, apparatuses, and non-transitory computer-readable medium described herein, the cross-link interference report indicates the first two cross-link interference metrics based on a value associated with the first two cross-link interference metrics being greater than a value associated with the second two cross-link interference metrics.

Some examples of the method, apparatuses, and non-transitory computer-readable medium described herein may further include operations, features, means, or instructions for receiving an indication of a UE capability associated with performing the one or more cross-link interference measurements, where the set of cross-link interference resources may be based on the UE capability.

DETAILED DESCRIPTION

Figure 1:
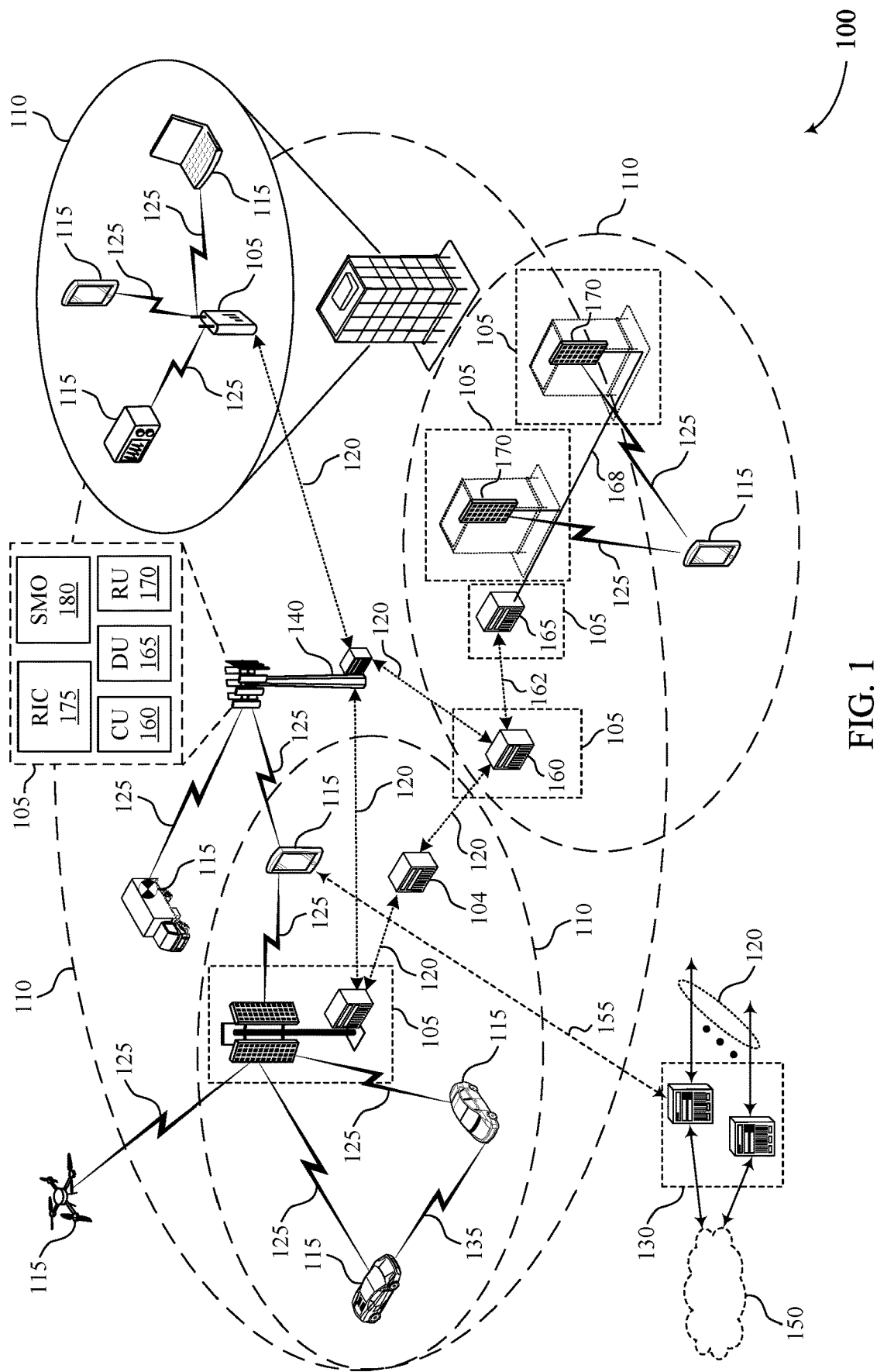
FIGS. 1, 2, 3A, 3B, and 4 each illustrate an example of a wireless communications system that supports cross-link interference measurement and reporting in a multiple transmission and reception point (TRP) system in accordance with one or more aspects of the present disclosure.

Some wireless communications systems may include a communication device, such as a user equipment (UE) or a network entity, that support wireless communications over one or more radio access technologies (RATs). Examples of RATs may include fourth generation (4G) systems, such as Long Term Evolution (LTE) systems, and fifth generation (5G) systems, which may be referred to as NR systems. The communication device may operate in a half-duplex mode or a full-duplex mode, or a combination thereof. For example, in a half-duplex mode, the communication device may either transmit communications or receive communications during a time period, such as a transmission time interval (TTI) that may span one or more time resources (e.g., symbols, mini-slots, slot). In a full-duplex mode, the communication device may transmit and receive communications simultaneously or concurrently. That is, communications received by the communication device may overlap in the time domain with communications transmitted by the communication device. For example, symbols occupied by or allocated for received signals may overlap with symbols occupied by or allocated for transmitted signals.

In some examples, neighboring communication devices (e.g., UEs or other wireless devices) may perform full-duplex communications or half-duplex time division duplexing (TDD) concurrently, such that downlink communications received by a first communication device may overlap in time, at least partially, with uplink communications transmitted by a second communication device (e.g., a neighboring communication device). In such an example, the uplink communications transmitted by the second communication device may interfere with the downlink communications received at the first communication device. Such interference may be referred to as cross-link interference. In some examples, cross-link interference may degrade wireless communications between the first communication device and the network. To mitigate or reduce effects of cross-link interference, the network may configure the first communication device to measure and report cross-link interference.

For example, the network may configure a communication device with resources for performing cross-link interference measurements on uplink signals transmitted by a neighboring communication device. In some examples, the communication device may perform the cross-link interference measurements based on a transmission configuration indicator (TCI) state associated with a data signal (e.g., a last received data signal in time) or a control resource set (e.g., a last monitored control resource set in time). In some examples, however, the communication device may be configured to operate in a multiple transmission and reception point (TRP) mode, such that the communication device may simultaneously receive downlink signals from multiple TRPs. In such examples, the communication device may receive the downlink signals from the multiple TRPs via multiple receive beams (e.g., separate beamforming directions that may each be associated with a respective TCI state). In some examples, the cross-link interference experienced by the communication device may be different for each of the multiple receive beams. In such an example, the communication device may not be capable of determining which receive beam (e.g., which TCI state) to use for performing the cross-link interference measurements.

Various aspects of the present disclosure generally relate to techniques for cross-link interference measurement and reporting in a multiple TRP system, and more specifically, to techniques for configuring a communication device with one or more TCI states for performing cross-link interference measurement and reporting. For example, the network may transmit control signaling to configure the communication device to measure and report cross-link interference measurement. In some examples, the control signaling may indicate one or more TCI states that the communication device may use for performing the cross-link interference measurements. For example, the communication device may perform the cross-link interference measurements using one or more receive beams that may each be associated with a respective TCI state indicated to the communication device via the control signaling. In some other examples, the network may configure the communication device to perform the cross-link interference measurements using one or more TCI states associated with a relatively last monitored control resource set or a relatively last received data signal (e.g., a relatively last received physical downlink shared channel (PDSCH) transmission). In some examples, the relatively last monitored control resource set or the relatively last received data signal may be associated with two TCI states. In such an example, the communication device may determine to use one or both of the TCI states for performing the cross-link interference measurements based on a respective identifier of each TCI state.

In some examples, the communication device may be configured to perform the cross-link interference measurements over multiple occasion. In such an example, if the communication device is configured to perform the cross-link interference measurements according to two (e.g., separate) TCI states, the communication device may perform the cross-link interference measurements according to one or both TCI states over each of the multiple occasions. In some examples, the network may configure the communication device to report one or more metrics (e.g., cross-link interference metrics) associated with the cross-link interference measurements. For example, the network may configure the communications device to report multiple cross-link interference metrics, in which each cross-link interference metric corresponds to cross-link interference measurements performed according to a single TCI state. Additionally, or alternatively, the network may configure the UE to report an average cross-link interference metric corresponding to cross-link interference measurements performed according to multiple TCI states.

Particular aspects of the subject matter described herein may be implemented to realize one or more of the following potential advantages. The techniques employed by the described communication devices may provide benefits and enhancements to the operation of the communication devices, including enabling the configuration of a communication device with one or more TCI states for performing cross-link interference measurements. Further, techniques for cross-link interference measurement and reporting in a multiple TRP system, as described herein, may support higher data rates, spectrum efficiency enhancement, and efficient resource utilization, thereby improving throughput and reliability. Such techniques may lead to improved network operations and network work efficiencies, among other benefits.

Aspects of the disclosure are initially described in the context of wireless communications systems. Aspects of the disclosure are also described in the context of measurement schemes and a process flow. Aspects of the disclosure are further illustrated by and described with reference to apparatus diagrams, system diagrams, and flowcharts that relate to cross-link interference measurement and reporting in a multiple TRP system.

FIG. 1 illustrates an example of a wireless communications system 100 that supports cross-link interference measurement and reporting in a multiple TRP system in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more RATs.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a TRP. One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or more different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170).

A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support cross-link interference measurement and reporting in a multiple TRP system as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set) for a physical control channel may be defined by a set of symbol periods and may extend across the system bandwidth or a subset of the system bandwidth of the carrier. One or more control regions (e.g., control resource sets) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, the wireless communications system 100 may support techniques for configuring a communication device, such as a UE 115, with one or more TCI states for performing cross-link interference measurement and reporting. For example, the UE 115 may receive a message, from the network, indicating a configuration for measurement of cross-link interference associated with the UE 115. The configuration may indicate one or more TCI states for the UE 115 to use for performing one or more cross-link interference measurements. In some examples, the UE 115 may perform the one or more cross-link interference measurements in accordance with the configuration. For example, the UE 115 may perform the one or more cross-link interference measurements over a set of cross-link interference resources using the one or more TCI states. In some examples, the UE 115 may transmit a cross-link interference report indicating one or more cross-link interference metrics corresponding to the one or more cross-link interference measurements. In some examples, by performing cross-link interference measurements according to the one or more TCI states, the UE 115 may increase the reliability of wireless communications between the UE 115 and the network, among other benefits.

Figure 2:
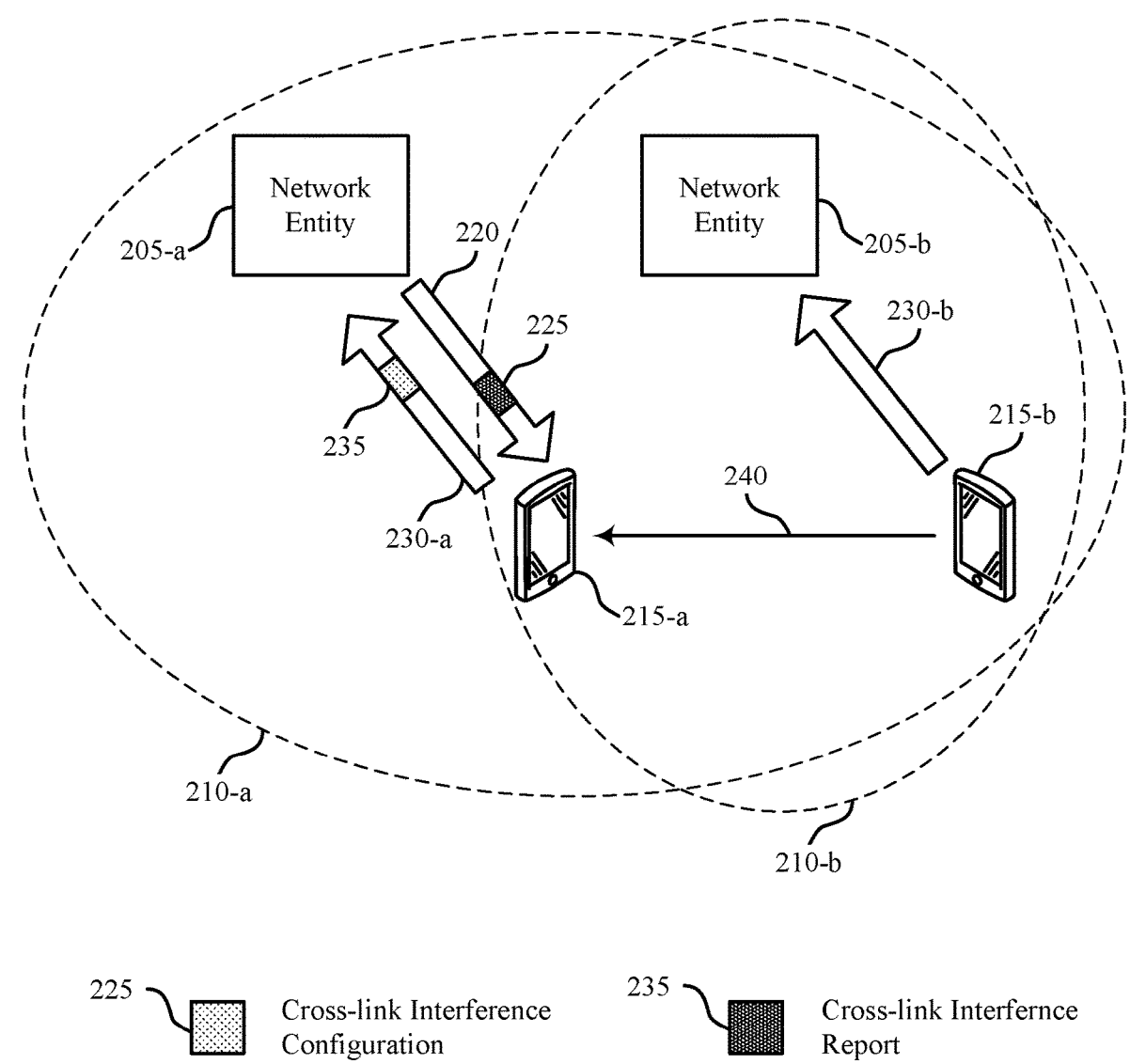

FIG. 2 illustrates an example of a wireless communications system 200 that supports cross-link interference measurement and reporting in a multiple TRP system in accordance with one or more aspects of the present disclosure. In some examples, the wireless communications system 200 may implement or be implemented by one or more aspects of the wireless communications system 100. For example, the wireless communications system 200 may include one or more UEs 215 (e.g., a UE 215-*a* and a UE 215-*b*), which may each be an example of a UE 115 described with reference to FIG. 1.

The wireless communications system 200 may also include one or more network entities 205 (e.g., a network entity 205-*a* and a network entity 205-*b*), which may each be an example of one or more network entities 105 (e.g., a CU, a DU, an RU, a base station, an IAB node, a TRP, or one or more other network nodes) as described with reference to FIG. 1. The network entities 205 and the UEs 215 may communicate within one or more coverage areas 210 (e.g., a coverage area 210-*a*, a coverage area 210-*b*), which may each be an example of a coverage area 110 as described with reference to FIG. 1. In the example, of FIG. 2, the network entity 205-*a* may serve a cell providing the coverage area 210-*a* and the network entity 205-*b* may serve a cell providing the coverage area 210-*b*. In some examples, the cell providing the coverage area 210-*a* may be an example of a macro cell over which downlink traffic may be relatively heavy (may exceed a threshold amount of traffic per unit time). Additionally, or alternatively, the cell providing the coverage area 210-*b* may be an example of a small cell over which uplink traffic may be relatively heavy. The wireless communications system 200 may include features for improved communications between the UE 215 and the network, among other benefits.

In the example of FIG. 2, the UEs 215 and the network entities 205 may communicate via one or more communication links. For example, the UE 215-*a* may transmit communications (e.g., uplink communications) to the network entity 205-*a* via a communication link 230-*a* and the UE 215-*b* may transmit communications to the network entity 205-*b* via a communication link 230-*b*. In the example of FIG. 2, the communication links 230 may be examples of uplink communication links. Additionally, or alternatively, the UE 215-*a* may receive communications (e.g., downlink communications) from the network entity 205-*a* via a communication link 220, which may be an example of a downlink communication link. The communication links 230 and the communication link 220 may each be an example of a communication link 125 as described with reference to FIG. 1.

In some examples, the UE 215-*a* and the UE 215-*b* may perform full-duplex communications or half-duplex TDD concurrently, such that downlink communications received by the UE 215-*a* (e.g., via the communication link 220) may overlap, at least partially, in time with uplink communications transmitted by the UE 215-*b* (e.g., via the communication link 230-*b*). In such an example, the UE 215-*a* and the UE 215-*b* may be spatially located, such that the concurrent uplink communications transmitted by the UE 215-*b* may lead to cross-link interference 240 at the UE 215-*a*. In some examples, the cross-link interference 240 may degrade the downlink communications received by the UE 215-*a*. Therefore, to reduce (e.g., mitigate or prevent) cross-link interference, the network (e.g., the network entity 205-*a*) may configure the UE 215-*a* to measure and report cross-link interference experienced at the UE 215-*a*. In some examples, the network may configure the UE 215-*a* to measure and report cross-link interference via higher layer (e.g., L3, RRC layer)) signaling. For example, the network may transmit a message (e.g., an RRC message) configuring the UE 215-*a* with resources (e.g., time and frequency resources) for performing cross-link interference measurements on uplink signals (e.g., sounding reference signals (SRSs)) transmitted by the UE 215-*b*. In some examples, the UE 215-*a* may perform the cross-link interference measurements within the configured (e.g., scheduled) resources.

In some examples, the cross-link interference measurements may include frequency domain measurements (e.g., frequency domain reference signal received power (RSRP) measurements) or time domain measurements (e.g., time domain received signal strength indicator (RSSI) measurements). For example, the network may configure the resources (e.g., for measuring SRSs transmitted by the UE 215-b) for RSSI measurements such as cross-link interference RSSI (CLI-RSSI) measurements). In some examples, the network may configure such resources via an information element (IE), such as an rssiResourceConfigCLI IE. In some other examples, the network may configure the resources (e.g., for measuring SRSs transmitted by the UE 215-b) for RSRP measurements (e.g., SRS-RSRP measurements). In some examples, the network may configure such resources via an IE, such as an srsResourceConfigCLI IE. It is to be understood that the names of IEs described herein may change based on implementation of one or multiple devices (e.g., the UEs 215, the network entities 205, or both), and the examples described herein should not be considered limiting to the scope of this disclosure.

In some examples, the UE 215-a may be capable of performing the cross-link interference measurements (e.g., CLI-RSSI measurements or SRS-RSRP measurements) within an active BWP (e.g., an active downlink BWP). In some examples (e.g., if the UE 215-a is configured to operate in a TDD mode), the network may configure the UE 215-a with one or more rules for performing the cross-link interference measurements (e.g., the CLI-RSSI measurements or the SRS-RSRP measurements) within the active BWP. For example, the UE 215-b may refrain from performing the SRS-RSRP measurements over resources (e.g., SRS resources) that may have a subcarrier spacing different from a subcarrier spacing configured for the active BWP confining the SRS resource. Additionally, or alternatively, the UE 215-a may refrain from performing the SRS-RSRP measurements over SRS resources that may not be confined (e.g., fully confined) within the downlink active BWP. Additionally, or alternatively, the UE 215-a may refrain from performing the SRS-RSRP measurements on SRS resources that may exceed a number (e.g., 32) of resources (REs, RBs, etc.). For example, the network may configure the UE 215-a to refrain from receiving (e.g., the network may refrain from scheduling) more than a number (e.g., 8) of SRS resources for performing the SRS-RSRP measurements during a time duration (e.g., slot).

In some examples, the UE 215-a may perform the cross-link interference measurements while operating in one or more modes. For example, the UE 215-a may perform the cross-link interference measurements while operating in a connected mode, such as an RRC connected intra-frequency (or inter-frequency) mode that may be indicated via an RRC_CONNECTED IE. Additionally, or alternatively, the UE 215-a may perform the cross-link interference measurements while operating in an idle mode, such as an RRC idle intra-frequency (or inter-frequency) mode that may be indicated via an RRC_IDLE IE. Additionally, or alternatively, the UE 215-a may perform the cross-link interference measurements while operating in an inactive mode, such as an RRC inactive intra-frequency (or inter-frequency) mode that may be indicated via an RRC_INACTIVE IE. Additionally, or alternatively, in some examples, the network may configure the UE 215-a to refrain from performing the cross-link interference measurements on a carrier (e.g., an NR carrier) that may occur over a same radio frequency band as a serving carrier (e.g., a carrier of a serving cell, such as an E-UTRA serving cell). Additionally, or alternatively, the network may configure the UE 215-a to perform the cross-link interference measurements if the UE 215-a supports simultaneous reception and transmission for inter-band carrier aggregation or inter-band dual connectivity (e.g., E-UTRA-NR dual connectivity, NR-E-UTRA dual connectivity, NR dual connectivity).

In some examples, the UE 215-a may determine (e.g., identify, select) a receive beam (e.g., a beamforming direction) for performing the cross-link interference measurements using a quasi co-location relationship associated with a TCI state. For example, the UE 215-a may perform the cross-link interference using a receive beam based on a quasi co-location relationship (e.g., a quasi co-location relationship associated with spatial parameters of the receive beam, a type-D quasi co-location relationship) between the configured resources and a TCI state (e.g., beam) used by the UE 215-a for receiving downlink data signals (e.g., PDSCH transmissions) or a TCI state (e.g., beam) used by the UE 215-a for monitoring control resource sets. In some examples, the UE 215-a may perform the cross-link interference measurements using a TCI state of a relatively last received PDSCH transmission or a relatively last monitored control resource set.

Additionally, or alternatively, the UE 215-a may perform the cross-link interference measurements according to an offset relative to a downlink reference timing in the serving cell (e.g., supported by the network entity 205-a). That is, as part of performing the cross-link interference measurements (e.g., RSRP measurements or RSSI measurements), the UE 215-a may apply an offset (e.g., a constant offset) derived by UE 215-a (or indicated to the UE 215-a by the network). In some examples, the value of the offset may be at least equal to a value determined according to the following Equation 1:

$$T_c * N_{TA\_offset} \quad (1)$$

where $T_c$ may represent a timing unit (e.g., a basic timing unit) that may depend on a subcarrier spacing configured for the UE 215-a (e.g., an uplink carrier subcarrier spacing or a downlink subcarrier spacing configured for the UE 215-a). Additionally, or alternatively, $N_{TA\_offset}$ may represent a timing offset (e.g., a timing advance offset) of the serving cell (e.g., supported by the network entity 205-a). In some examples, a value of $N_{TA\_offset}$ may be indicated to the UE 215-a by the network via an IE, such as an nTimingAdvanceOffset IE. For example, the network may configure a UE (e.g., the UE 215-a or the UE 215-b) with a timing advance value (e.g., $N_{TA\_offset}$) to be applied by the UE, such that uplink transmissions received by the network may be synchronized.

In some examples, the UE 215-a may be configured to operate in a multiple TRP mode, such that the UE 215 may simultaneously receive downlink signals from multiple TRPs. For example, the UE 215-a may simultaneously receive downlink communications from the network entity 205-a and another network entity (not shown). In such an example, the UE 215-a may receive the downlink communications from the multiple TRPs via multiple receive beams (e.g., separate receive beams) that may each be associated with a respective TCI state. Therefore, the cross-link interference experienced by the UE 215-a (e.g., due concurrent uplink communications transmitted by the UE 215-b) may be different for each of the multiple receive beams.

In some examples, techniques for cross-link interference measurement and reporting in a multiple TRP system, as described herein, may provide one or more enhancements to communications between the UE 215-a and the network by enabling the UE 215-a to perform cross-link interference measurements using one or more TCI states. For example, the UE 215-a may receive a message from the network entity 205-a (e.g., via the communication link 220) indicating a cross-link interference configuration 225. The cross-link interference configuration 225 may be an example of a configuration for measurement of cross-link interference associated with the UE 215-a. In some examples, the cross-link interference configuration 225 may indicate one or more TCI states for the UE 215-a to use for performing one or more cross-link interference measurements.

In some examples, the UE 215-a may perform the one or more cross-link interference measurements in accordance with the cross-link interference configuration 225. For example, the UE 215-a may perform the one or more cross-link interference measurements over a set of cross-link interference resources using the one or more TCI states indicated by the cross-link interference configuration 225. In some examples, the UE 215 may transmit a cross-link interference report 235 indicating one or more cross-link interference metrics corresponding to the one or more cross-link interference measurements. In some examples, by transmitting the cross-link interference report 235, the UE 215-a may enhance cross-link interference techniques performed by the network entity 205-a, thereby increasing communication reliability between the UE 215-a and the network entity 205-a, among other benefits.

Figure 3A:
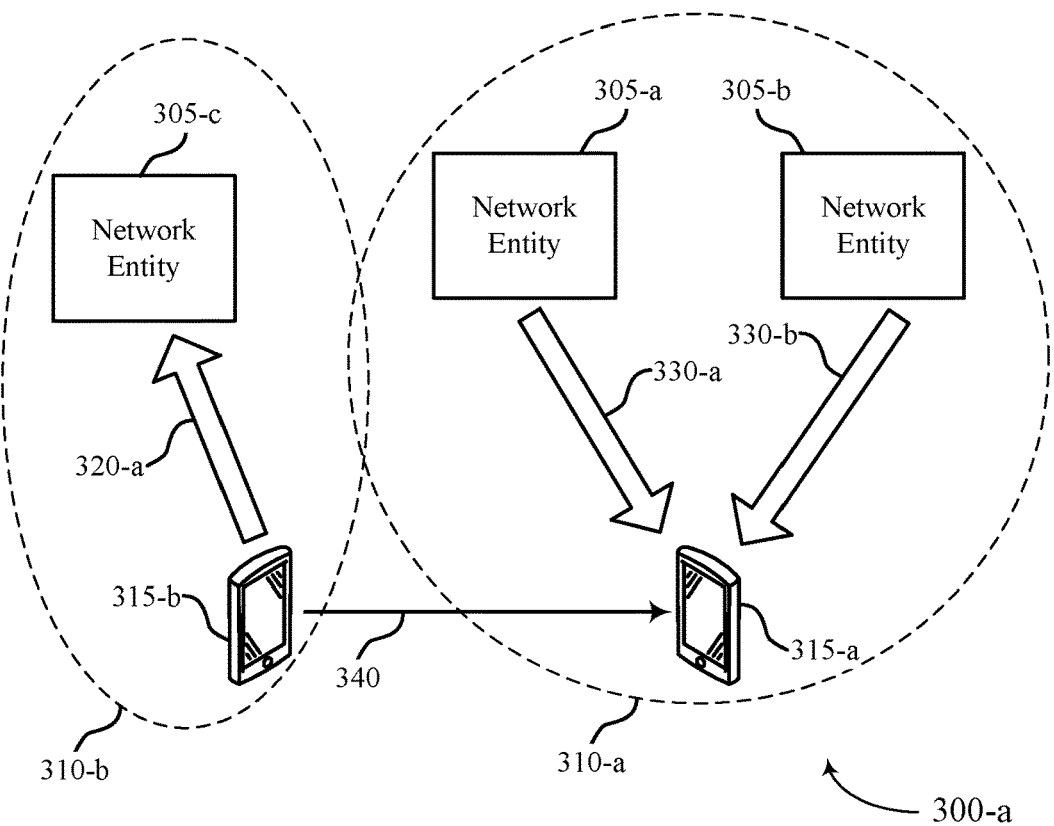
Figure 3B:
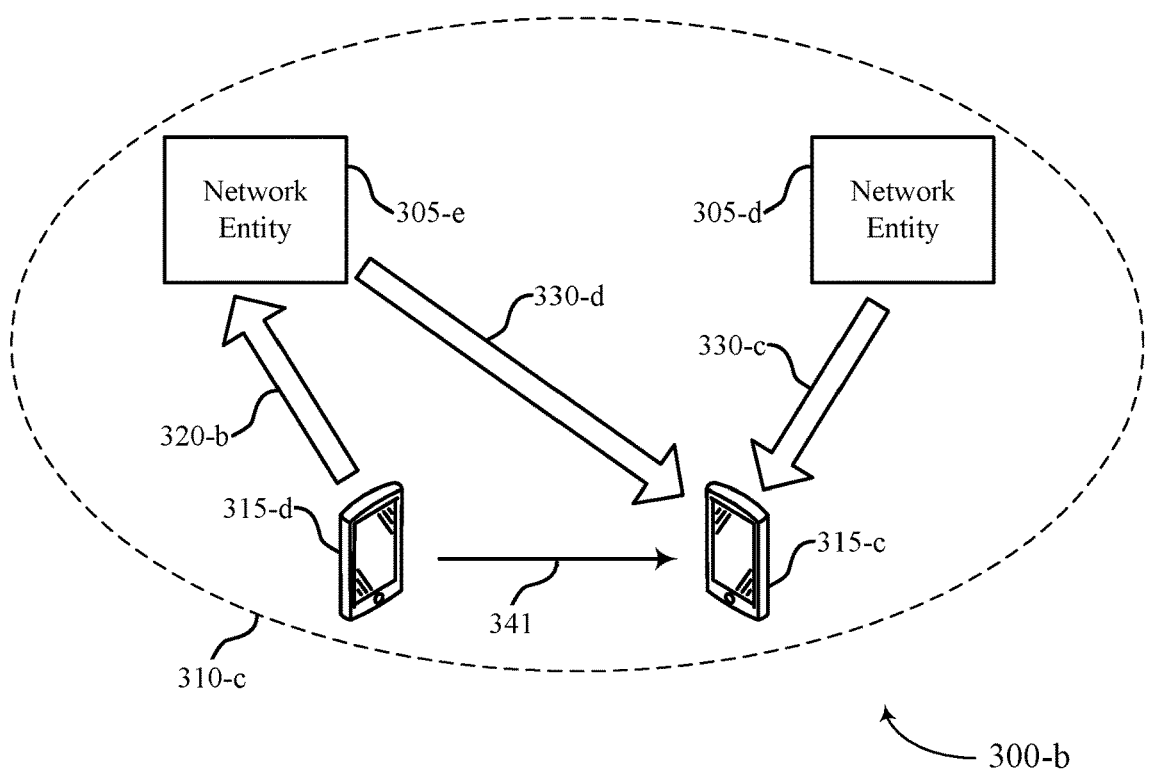

FIGS. 3A and 3B each illustrate an example of a wireless communications system 300 that supports cross-link interference measurement and reporting in a multiple TRP system in accordance with one or more aspects of the present disclosure. In some examples, the wireless communications systems 300 (e.g., a wireless communications system 300-a and a wireless communications system 300-b) may implement aspects of the wireless communications system 100 and the wireless communications system 200. For example, the wireless communications systems 300 may each include one or more network entities 305 (e.g., a network entity 305-a, a network entity 305-b, a network entity 305-c, a network entity 305-d, and a network entity 305-e) and one or more UEs 315 (e.g., a UE 315-a, a UE 315-b, a UE 315-c, and a UE 315-d), which may be examples of the corresponding devices as described with reference to FIGS. 1 and 2. In the example of FIGS. 3A and 3B, the network entities 305 may each be an example of a CU, a DU, an RU, a base station, an IAB node, a TRP, or one or more other network nodes as described with reference to FIG. 1.

In the examples of FIG. 3A the UE 315-b and the network entity 305-c may communicate within a coverage area 310-b. For example, the UE 315-b may transmit communications to the network entity 305-c via a communication link 320-a. Additionally, or alternatively, the UE 315-a, the network entity 305-a, and the network entity 305-b may communicate within a coverage area 310-a. For example, the UE 315-a may receive communications from the network entity 305-a via a communication link 330-a and from the network entity 305-b via a communication link 330-b. In the examples of FIG. 3B the UE 315-c, the UE 315-d, the network entity 305-d, and the network entity 305-e may communicate within a coverage area 310-c. For example, the UE 315-d may transmit communications to the network entity 305-e via a communication link 320-b. Additionally, or alternatively, the UE 315-c may receive communications from the network entity 305-d via a communication link 330-c and from the network entity 305-e via a communication link 330-d. In some examples, the communication links 320 may each be an example of an uplink and the communication links 330 may each be an example of a downlink. Additionally, or alternatively, the communication links 320 and the communication links 330 may each be an example of communication link 125 as described with reference to FIG. 1. Additionally, or alternatively, the coverage areas 310 may each be an example of a coverage area 110 as described with reference to FIG. 1. The wireless communications systems 300 may each include features for improved communications between the UEs 315 and the network, among other benefits.

Each wireless communications system 300 may illustrate communication devices (e.g., one or more UEs 315 or one or more network entities 305) operating in a full duplex mode (e.g., performing full-duplex wireless communications) or in a half-duplex TDD mode (e.g., performing half-duplex TDD wireless communications). That is, full-duplex capabilities or half-duplex TDD capabilities (or both) may be present at one or more UEs 315, one or more network entities 305, or a combination thereof. For example, the network entity 305-e may be capable of full duplex communications that may enable simultaneous downlink transmission and uplink reception within a same component carrier. Additionally, or alternatively, each wireless communications system 300 may illustrate the UEs 315 operating in a multiple TRP mode, such that one or more of the UEs 315 may simultaneously receive downlink communications (e.g., PDSCH transmissions) from multiple TRPs. For example, each wireless communications system 300 may illustrate one or more multiple TRP PDSCH schemes. In some examples, as illustrated in the example of FIG. 3A, the UE 315-a may simultaneously receive downlink communications the network entity 305-a and the network entity 305-b. In such an example, the network entity 305-a and the network entity 305-b may be examples of TRPs serving a same cell (e.g., a cell providing the coverage area 310-a). In some examples, the downlink communications received by the UE 315-a (e.g., from the network entity 305-a and the network entity 305-b) may occur concurrently with uplink communications transmitted by the UE 315-b to the network entity 305-c (e.g., serving a cell providing the coverage area 310-b). In such examples, the uplink communications transmitted by the UE 315-b may lead to inter-cell cross-link interference 340 at the UE 315-a.

In other examples, as illustrated in the example of FIG. 3B, the UE 315-c may simultaneously receive downlink communications the network entity 305-d and the network entity 305-e. In such examples, the network entity 305-d and the network entity 305-e may be examples of TRPs serving a same cell (e.g., a cell providing a coverage area 310-c) and the network entity 305-e may serve both the UE 315-c and the UE 315-d. In some examples, the downlink communications received by the UE 315-c (e.g., from the network entity 305-d and the network entity 305-e) may occur concurrently with uplink communications transmitted by the UE 315-d to the network entity 305-e. In such an example, the uplink communications transmitted by the UE 315-d may lead to intra-cell cross-link interference 341 at the UE 315-c.

In some examples, the wireless communications systems 300 may support one or more single downlink control information (DCI) PDSCH schemes, such as a TDM scheme, an FDM scheme, a spatial division multiplexing (SDM) scheme, or a single frequency network (SFN) scheme. In some examples, a single DCI PDSCH scheme may refer to a multiple TRP deployment, in which PDSCH receptions (e.g., scheduled by a single DCI) may be associated with multiple (e.g., two) TCI states (e.g., one TCI state per TRP configured for communications with the UEs 315). For example, as illustrated in the example of FIG. 3A, the network entity 305-a and the network entity 305-b may be synchronized, such that the UE 315-a may receive a single DCI message (e.g., from the network entity 305-*a* or the network entity 305-*b*) scheduling PDSCH receptions from the network entity 305-*a* and the network entity 305-*b* (e.g., multiple TRPs). In some examples, the UE 315-*a* may indicate (e.g., to the network) a capability for performing single DCI PDSCH reception using multiple (e.g., two) beams via an IE, such as a defaultTwoBeams IE.

In some examples of a single DCI PDSCH scheme, the UE 315-*a* may receive downlink communications (e.g., PDSCH transmissions) from the network entity 305-*a* via a first receive beam (e.g., a first PDSCH beam (not shown)) associated with a first TCI state and PDSCH transmissions from the network entity 305-*b* via a second PDSCH beam (not shown) associated with a second TCI state. In such examples, the inter-cell cross-link interference 340 experience by the UE 315-*a* for the first PDSCH beam may be different from the inter-cell cross-link interference 340 experienced by the UE 315-*a* for the second PDSCH beam. Therefore, the network may configure the UE 315-*a* to measure and report the inter-cell cross-link interference 340 using one or more TCI states.

For example, the network may configure the UE 315-*a* to determine whether to use a single TCI state (e.g., a single PDSCH beam) or dual TCI states (e.g., dual PDSCH beams) for performing the cross-link interference measurements. For single TCI state cross-link interference measurements, the network may configure the UE 315-*a* to use a single PDSCH beam (e.g., the first PDSCH beam or the second PDSCH beam) or a default beam. In some examples, the network may configure the UE 315-*a* to report one or more metrics associated with the cross-link interference metrics (e.g., cross-link interference metrics). That is, the network may configure the UE 315-*a* to report one or more cross-link interference metrics corresponding to the cross-link interference measurements. For example, the network may configure the UE 315-*a* to report a single metric (e.g., one metric corresponding to cross-link interference measurements performed using both the first PDSCH beam associated with the first TCI state and the second PDSCH beam associated with the second TCI state) or two metrics (e.g., one metric corresponding to cross-link interference measurements performed using the first PDSCH beam associated with the first TCI state and one metric for cross-link interference measurements performed using the second PDSCH beam associated with the second TCI state).

In some examples, if the UE 315-*a* is configured to report a single metric, the UE 315-*a* may report (e.g., indicate) the cross-link interference metric associated with the TCI state (e.g., which PDSCH beam used to receive PDSCH transmissions) that may be experiencing an increased amount of cross-link interference. Additionally, or alternatively, in some examples, the network may configure the UE 315-*a* to perform filtering (e.g., of the cross-link interference measurements, such as to reduce the impact of fading or other channel impairments on the measurements performed by the UE 315-*a*) via a same filter across both PDSCH beams (e.g., a same filter for both the first PDSCH beam associated with the first TCI state and the second PDSCH beam associated with the second TCI state) or a different filter for each of the PDSCH beams (e.g., a first filter for the first PDSCH beam associated with the first TCI state and a second filter for the second PDSCH beam associated with the second TCI state).

Additionally, or alternatively, the wireless communications systems 300 may support one or more multiple DCI PDSCH schemes, for example if the multiple TRPs (e.g., network entities 305) are not synchronized or are partially synchronized. For example, as illustrated in the example of FIG. 3B, the UE 315-*c* may receive a DCI message from the network entity 305-*d* scheduling PDSCH receptions from the network entity 305-*d* and another DCI message from the network entity 305-*e* scheduling PDSCH receptions from the network entity 305-*e*. In some examples, a structure (e.g., a DCI structure for scheduling PDSCH receptions) associated with a multiple DCI PDSCH scheme may include one or more same features as a carrier aggregation deployment. Additionally, or alternatively, for some multiple DCI PDSCH schemes, downlink receptions and uplink transmissions (e.g., scheduled for the UE 315-*c*) may each be associated with a particular control resource set identifier (e.g., indicated via a CORESETPoolIndex IE). For example, the network may configure the UE 315-*c* to monitor multiple control resource sets associated with respective control resource set identifiers and the value of each control resource set identifier may indicate a TCI state associated a TRP (e.g., a network entity 305).

In some examples of a multiple DCI PDSCH scheme, the UE 315-*c* may receive downlink communications (e.g., PDSCH transmissions) from the network entity 305-*d* via a first receive beam (e.g., a first PDSCH beam) associated with a first TCI state and PDSCH transmissions from the network entity 305-*e* via a second PDSCH beam associated with a second TCI state. In such examples, the intra-cell cross-link interference 341 experienced by the UE 315-*c* for the first PDSCH beam may be different from the intra-cell cross-link interference 341 experienced by the UE 315-*c* for the second PDSCH beam. Therefore, the network may configure the UE 315-*c* to measure and report the cross-link interference using one or more TCI states.

In some examples, the network may configure the UE 315-*c* to perform cross-link interference measurements over multiple occasion (e.g., time occasions, measurement occasions). In such examples, the network may configure the UE 315-*c* to determine a PDSCH beam (or multiple PDSCH beams) for performing the cross-link interference measurements over each of the multiple occasions. In some examples, the network may configure the UE 315-*c* to perform the cross-link interference measurements (e.g., associated with the network entity 305-*d*, the network entity 305-*e*, or both) using a PDSCH beam (e.g., indicated to the UE 315-*c* by the network) or a default beam based on a value of the control resource set identifier (e.g., based on whether the value of the CORESETPoolIndex is equal to 0 or 1). In such an example, the network may configure the UE 315-*c* to report the cross-link interference measurements performed over the multiple occasions to the network entity 305-*d* and the network entity 305-*e* (e.g., to each TRP independently) or the network may configure the UE 315-*c* to report (e.g., jointly report) the cross-link interference measurements performed over the multiple occasions to the network entity 305-*d* or the network entity 305-*e* (e.g., to one TRP).

In some examples, by performing the cross-link interference measurements according to one or more TCI states, the UEs 315 may achieve an increased granularity in the cross-link interference measurements, thereby providing one or more enhancements to cross-link interference mitigation at the network, among other benefits.

Figure 4:
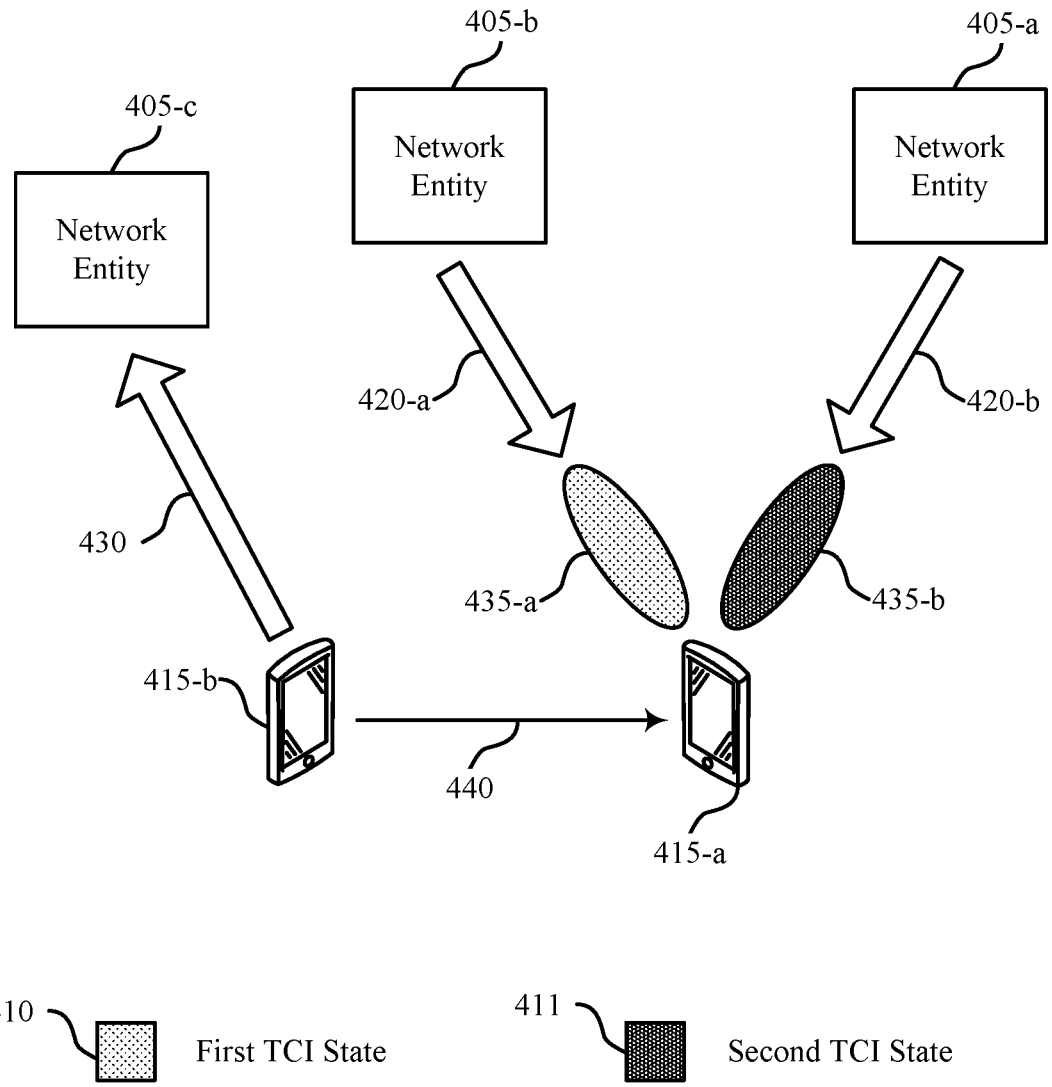

FIG. 4 illustrates an example of a wireless communications system 400 that supports cross-link interference measurement and reporting in a multiple TRP system in accordance with one or more aspects of the present disclosure. In some examples, the wireless communications system 400 may implement aspects of the wireless communications system 100, the wireless communications system 200, and the wireless communications systems 300. For example, the wireless communications systems 400 may include one or more network entities 405 (e.g., a network entity 405-a, a network entity 405-b, and a network entity 405-c) and one or more UEs 415 (e.g., a UE 415-a and a UE 415-b), which may be examples of the corresponding devices as described with reference to FIGS. 1, 2, 3A, and 3B. In the example of FIG. 4, the network entities 405 may each be an example of a CU, a DU, an RU, a base station, an IAB node, a TRP, or one or more other network nodes as described with reference to FIG. 1. The wireless communications system 400 may include features for improved communications between the UEs 415 and the network, among other benefits.

In the example of FIG. 4, the UEs 415 and the network entities 405 may communicate via one or more communication links. For example, the UE 415-a may receive communications (e.g., downlink communications) from the network entity 405-a via a communication link 420-a and from the network entity 405-b via the communication link 420-b. In the example of FIG. 4, the communication links 420 may be examples of downlinks. Additionally, or alternatively, the UE 415-a may transmit communications (e.g., uplink communications) to the network entity 405-c via a communication link 430, which may be an example of an uplink. The communication link 430 and the communication links 420 may each be an example of a communication link 125 as described with reference to FIG. 1.

In some examples, the UE 415-a (e.g., and the UE 415-b) may be configured to operate in a multiple TRP mode, such that one or more UEs 415 may simultaneously receive downlink signals (e.g., PDSCH transmissions) from multiple TRPs (e.g., network entities 405). For example, the UE 415-a may be configured to operating according to a multiple TRP PDSCH scheme. In some examples, as illustrated in the example of FIG. 4, the UE 415-a may simultaneously receive PDSCH transmissions from the network entity 405-a and the network entity 405-b. Additionally, or alternatively, the UE 415-a and the UE 415-b may be configured to perform half-duplex TDD communications (e.g., or full-duplex communications) concurrently, such that the PDSCH transmissions received by the UE 415-a may overlap (e.g., in time) with uplink communications (e.g., PUSCH transmissions or PUCCH transmissions) transmitted by the UE 415-b. In such an example, the UE 415-a and the UE 415-b may be spatially located, such that the uplink communications transmitted by the UE 415-b may lead to cross-link interference 440 at the UE 415-a. In some examples, the UE 415-a and the UE 415-b may be operating in a same cell. In such an example, the cross-link interference 440 may be an example of intra-cell cross-link interference as described with reference to FIG. 3B. In some other examples, the UE 415-a may be operating in a cell different from the cell in which the UE 415-b may be operating. In such examples, the cross-link interference 440 may be an example of inter-cell cross-link interference as described with reference to FIG. 3A.

In some examples, if the UE 415-a is operating in a multiple TRP framework, the UE 415-a may receive the PDSCH transmissions from the network entity 405-a via a receive beam 435-a (e.g., a first PDSCH beam) associated with a first TCI state 410 and PDSCH transmissions from the network entity 405-b via a receive beam 435-b (e.g., a second PDSCH beam) associated with a second TCI state 411. In such examples, the cross-link interference 440 experience by the UE 415-a for the receive beam 435-a (e.g., associated with the first TCI state 410) may be different from the cross-link interference 440 experienced by the UE 415-a for the receive beam 435-b (e.g., associated with the second TCI state 411). Therefore, to mitigate the cross-link interference 440, the network (e.g., the network entity 405-a or the network entity 405-b) may configure the UE 415-a to perform the cross-link interference measurements using the first TCI state 410, the second TCI state 411, or both.

In some examples, the network may configure the UE 415-a to apply a timing offset, such that the cross-link interference measurements of the uplink transmissions (e.g., transmitted by the UE 415-b) may be aligned. That is, for the cross-link interference measurements (e.g., SRS-RSRP measurements and CLI-RSSI measurements), the UE 415-a may apply an offset (e.g., a constant offset, a timing advance offset) relative to the downlink reference timing in the serving cell. In some examples, the offset value (e.g., the timing advance offset value) may be derived based on the uplink timing of a TRP (e.g., an uplink timing associated with the network entity 405-a or the network entity 405-b) from which the UE 415-a may be receiving the downlink communications (e.g., PDSCH transmissions). For example, PDSCH transmissions from the multiple TRPs may not be synchronized (e.g., for a multiple DCI framework). In such an example, the network may indicate one or more timing offsets (e.g., timing advance offsets) for performing the cross-link interference measurements. For example, the network may indicate for the UE 415-a to apply a timing advance offset associated with the network entity 405-a, the network entity 405-b, or both. That is, the UE 415-a may select an offset value based on a TRP associated with a downlink receive beam used to perform the cross-link interference measurements. Additionally, or alternatively, the offset value may be determined based on a metric associated with the uplink timing offsets of both TRPs (e.g., associated with the network entity 405-a and the network entity 405-b). In some examples, the metric may correspond to a maximum timing offset value (e.g., max(TA1, TA2)) a minimum timing offset value (e.g., min(TA1, TA2)), an average timing offset value (e.g., mean(TA1, TA2)) or an otherwise suitable timing offset value.

For example, the network may configure the UE 415-a to perform cross-link interference measurements (e.g., SRS-RSRP measurements or CLI-RSSI measurements) in a multiple TRP framework, in which PDSCH transmissions received by the UE 415-a are associated with multiple TCI states. In such an example, the timing of the uplink transmissions (e.g., transmitted by the UE 415-b and measured by the UE 415-a) may be associated with multiple timing offsets (e.g., timing advance offsets) and multiple power controls. That is, the timing advance offset associated with the receive beam 435-a and the receive beam 435-b may be different and, as such, the timing of the uplink transmissions measured by the UE 415-a via the receive beam 435-a may be different from the timing of the uplink transmissions measured via the receive beam 435-b. In such example, the network may configure the UE 415-a to measures the cross-link interference (e.g., determine the cross-link interference metrics) using a single receive beam (e.g., a single TCI state) or dual receive beams (e.g., two TCI states). In some examples, if the network configures (e.g., indicates for) the UE 415-a to measure cross-link interference with a single receive beam (e.g., the receive beam 435-a or the receive beam 435-b), the network may indicate, to the UE 415-a, which receive beam 435 may be used by the UE 415-a for performing the cross-link interference measurements. For example, the network may indicate for the UE 415-*a* to use the first TCI state 410 or the second TCI state 411 for performing the cross-link interference measurements.

In some examples, the network may configure the UE 415-*a* with resources for performing the cross-link interference measurements (e.g., SRS resources) based on the multiple TCI states. For example, the network may configure the UE with multiple resources (e.g., sets of resources, symbols) for each TCI state. In such an example, each measurements (e.g., over a particular resources) may be associated with one of the two TCI states of the PDSCH transmissions (e.g., one of the two TCI states used to receive PDSCH transmissions, the receive beam 435-*a* or the receive beam 435-*b*). Additionally, or alternatively, the network may configure (e.g., jointly) the resources for both TCI states. In such an example, each measurement (e.g., over the configured resources) may be associated with both TCI states (e.g., both TCI states used to receive PDSCH transmissions, the receive beam 435-*a* and the receive beam 435-*b*).

In some examples, the network may indicate whether (e.g., and how) the UE 415-*a* may filter the cross-link interference measurements (or the cross-link interference metrics corresponding to the cross-link interference measurements). For example, the network may configure the UE 415-*a* to use a same filter (e.g., same L3 filtering) across both TCI states (e.g., the first TCI state 410 and the second TCI state 411) or a different filter (e.g., different L3 filtering) between the two TCI states (e.g., a first filter for the first TCI state 410 and a second filter for the second TCI state 411).

Additionally, or alternatively, if the network indicates for the UE 415-*a* to measure cross-link interference using dual beams (e.g., the receive beam 435-*a* and the receive beam 435-*b*), the network may indicate for the UE 415-*a* to report multiple cross-link interference metrics (e.g., one associated with each TRP) or a single cross-link interference metric (e.g., associated with one of the multiple TRPs or an average metric associated with all of the TRPs). For example, the network may configure the UE 415 to report a cross-link interference metric associated with the first TCI state 410, a cross-link interference metric associated with the second TCI state 411, or a cross-link interference metric (e.g., an average cross-link interference metric) associated with both the first TCI state 410 and the second TCI state 411.

In some examples, the network may configure the UE 415-*a* to perform the cross-link interference measurements across multiple occasions (e.g., different sets of cross-link interference resources) using multiple receive beams (e.g., based on two different quasi co-location relationships associated with separate TCI states). In such examples, the network may configure the UE 415-*a* to filter the cross-link interference measurements across the multiple occasions and report a single cross-link interference metric. For example, the UE 415-*a* filter the cross-link interference measurements across two occasions, in which the cross-link interference measurements are performed using two receive beams, and report an average (e.g., a linear average, a linear weighted average) of two cross-link interference metrics, in which each of the two cross-link interference metrics corresponds to cross-link interference mismeasurements performed over one of the two occasions using one of the two receive beams.

Additionally, or alternatively, the network may configure the UE 415-*a* to report a filtered average of the two cross-link interference metrics measured with the different receive beams. For example, the UE 415-*a* may filter the cross-link interference measurements (e.g., prior to reporting the associated cross-link interference metrics) according to the following Equation 2:

$$F_n(i) = (1 - \alpha(i)) * F_{n-1}(i) + \alpha(i) * M_n \quad (2)$$

where $F_n(i)$ may represent a filtered cross-link interference measurement (e.g., an updated filtered result) that may be reported to the network (e.g., used by the UE 415-*a* for evaluation of reporting criteria or for cross-link interference measurement reporting). In some examples, $F_n(i)$ may be index from 0 to 1 (e.g., i=0, 1), where a value of 0 may corresponding to a first receive beam (e.g., a receive beam 435-*a* associated with the first TCI state 410) and a value of 1 may correspond to a second receive beam (e.g., a receive beam 435-*b* associated with the second TCI state 411). Additionally, or alternatively, $M_n$ may represent a relatively last determined cross-link interference measurement (e.g., relatively last cross-link interference measurement result received at the RRC layer from the physical (PHY) layer). Additionally, or alternatively, $\alpha(i)$ may represent a filtering coefficient. In some examples, the network may configure the UE 415-*a* to report two different filtered cross-link interference metrics (e.g., of both cross-link interference metrics) and a linear average of the two cross-link interference metrics. In some examples, the network may configure the UE 415-*a* with two filtering coefficients (e.g., $\alpha(i)$ for i=0, 1), for example via a filterCoefficient IE.

In some examples, the network may configure the UE 415-*a* to compare multiple cross-link interference metrics and select a cross-link interference metric (e.g., to report to the network) associated with an increased amount of interference (e.g., the cross-link interference metric associated with a relatively high value). For example, the network may configure the UE 415-*a* to drop a cross-link interference metric (e.g., of multiple cross-link interference metrics) based on determining that the cross-link interference metrics fails to satisfy the threshold (or corresponds to a reduced amount of cross-link interference compared to other of the multiple cross-link interference metrics). In such an example, the UE 415-*a* may report another cross-link interference metric (e.g., of the multiple cross-link interference metrics) or an average of the other cross-link interference metrics.

In some examples, the network may configure the UE 415-*a* to perform cross-link interference measurement and reporting via control signaling. For example, the network may transmit control signaling that may include a parameter (e.g., an RRC parameter, such as the CORESETPoolIndex IE) to indicate to the UE 415-*a* an association between resources (e.g., time and frequency resources) to be used for performing the cross-link interference measurements and each TRP. That is, the network may configure the UE 415-*a* with resources (e.g., cross-link interference resources) for performing cross-link interference measurements that may be associated with each network entity 405 configured for communications with the UE 415-*a*. In some examples, the control signaling may include such a parameter per cross-link interference resource scheduled for the UE 415-*a* (e.g., per indicated cross-link interference resource). In some examples, the cross-link interference resources may be SRS resources, such as may be indicated via an SRS-ResourceConfigCLI-r16 IE. Additionally, or alternatively, the cross-link interference resources may be RSSI resources, such as may be indicated via an RSSI-ResourceConfigCLI-r16 IE.

Additionally, or alternatively, the network may configure the UE 415-*a* to perform cross-link interference measurement and reporting based on one or more PDSCH transmissions receive by the UE 415-*a* or one or more control resource sets monitored by the UE 415-*a*. For example, if a relatively last PDSCH transmission (e.g., relatively last received PDSCH transmission) or a relatively last control resource set (e.g., relatively last monitored control resource set) is associated with multiple (e.g., two) TCI states, the UE 415-*a* may determine that the cross-link interference resources (e.g., indicated to the UE 415-*a* for performing the cross-link interference measurements) are quasi co-located (e.g., with respect to spatial parameters of the receive beam, a type-D quasi co-located) with one or both of the TCI states associated with the PDSCH transmission or the control resource set. For example, the UE 415-*a* may determine that the cross-link interference resources are quasi co-located with the first TCI state 410, the second TCI state 411, or both. That is the UE 415 may perform the cross-link interference measurements based on a single quasi co-location relationship associated with at least one TCI state of the two TCI states associated with the relatively last received PDSCH transmission or the relatively last monitored control resource set.

Additionally, or alternatively, the UE 415 may determine that the cross-link interference resources are quasi co-located with a TCI state having a relatively lowest identifier or a relatively highest identifier (e.g., relative to the other configured TCI states). For example, the UE 415-*a* may perform the cross-link interference measurements based on a quasi co-location relationship associated with a TCI state (e.g., the first TCI state 410, the second TCI state 411) that may correspond to a lowest TCI state identifier or a highest TCI state identifier of the two TCI states associated with the relatively last received PDSCH transmission or the relatively last monitored control resource set (e.g., associated with two TCI states).

Additionally, or alternatively, the UE 415-*a* may perform the cross-link interference measurements over multiple occasions (e.g., measurement occasions, time occasions). In such an example the UE 415 may determine that the cross-link interference resources are quasi co-located with the first TCI state 410 for a first occasion and the second TCI 411 for a second occasion. That is, the UE 415 may perform the cross-link interference measurements in accordance with alternating TCI states, for example via TDM. For example, the UE 415-*a* may perform a first set of cross-link interference measurements based on a first quasi co-location relationship associated with the first TCI state 410 over a first occasion (e.g., a first one or more cross-link interference resources) and a second set of cross-link interference measurements based on a second quasi co-location relationship associated with the second TCI state 411 over a second occasion (e.g., a second one or more cross-link interference resources). In some examples, the UE 415-*a* may determine that the cross-link interference resources are quasi co-located with both the first TCI state 410 and the second TCI 411. For example, the UE 415 may perform the cross-link interference measurements based on two quasi co-location relationships, where one of the two quasi co-location relationships is associated with the first TCI state 410 and the other of the two quasi co-location relationships is associated with the second TCI state 411.

In some examples, if the UE 415-*a* performs two cross-link interference measurements over a single cross-link interference resource (e.g., over a single time and frequency resource) using each of two receive beams (or using two uplink timing offsets) each of the two cross-link interference measurements may be counted (e.g., as two measurements) towards a quantity (e.g., a maximum quantity or otherwise acceptable quantity) of CLI-SRS resource measurements capable of being performed at the UE 415-*a* (e.g., a UE capability for CLI-SRS resource measurements). That is, while the two cross-link interference measurements occur over a same time and frequency resource, the two cross-link interference measurements may occupy two cross-link interference resources of a number of cross-link interference resources over which the UE 415-*a* may be capable of performing the cross-link interference measurements. As such, the network may configure the UE 415-*a* to report the number (e.g., a maximum number or an otherwise suitable number) of cross-link interference resources over which the UE 415-*a* may be capable of performing the cross-link interference measurements. For example, the UE 415-*a* may transmit an indication of a UE capability associated with performing the one or more cross-link interference measurements (e.g., the number of cross-link interference resources over which the UE 415-*a* may be capable of performing the cross-link interference measurements). In such an example, the network may configure (e.g., schedule) the UE 415-*a* with cross-link interference resources based on the reported UE capability.

In some examples, by configuring the UE 415 with cross-link interference resources based on the reported UE capability, the network may provide one or more enhancements to cross-link interference measurement and reporting at the UE 415-*a*, among other benefits.

Figure 5:
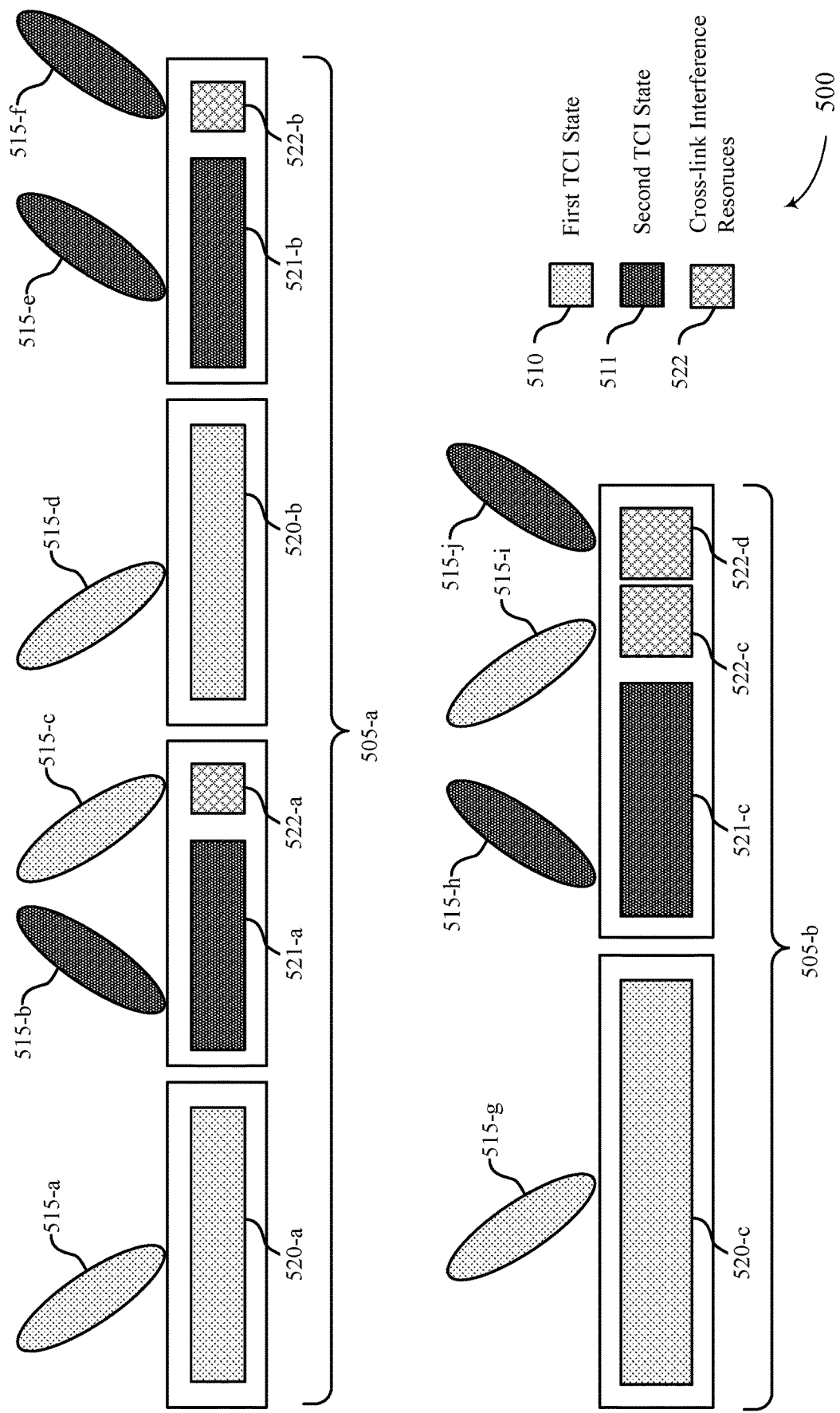
FIGS. 5 and 6 each illustrate an example of a measurement scheme that supports cross-link interference measurement and reporting in a multiple TRP system in accordance with one or more aspects of the present disclosure.

FIG. 5 illustrates an example of a measurement scheme 500 that supports cross-link interference measurement and reporting in a multiple TRP system in accordance with one or more aspects of the present disclosure. In some examples, the measurement scheme 500 may implement aspects of the wireless communications system 100, the wireless communications system 200, the wireless communications systems 300, and the wireless communications system 400. For example, the measurement scheme 500 may be implemented by one or more network entities and a UE, which may be examples of the corresponding devices as described with reference to FIGS. 1, 2, 3A, 3B, and 4. In the example of FIG. 5, the network entities may each be an example of a CU, a DU, an RU, a base station, an IAB node, a TRP, or one or more other network nodes as described with reference to FIG. 1. The measurement scheme 500 may include features for improved communications between the UE and the network, among other benefits.

As illustrated in the example of FIG. 5, the UE may perform cross-link interference measurements according to one or more TCI states. For example, the network may configure the UE to determine one or more TCI states for performing cross-link interference measurements based one or more downlink communications (e.g., PDSCH transmissions) receive by the UE or one or more control resource sets monitored by the UE. For example, if a PDSCH transmission (e.g., relatively last received PDSCH transmission) or a control resource set (e.g., a relatively last monitored control resource set) is associated with multiple (e.g., two) TCI states, the UE may determine that resources for performing the cross-link interference measurements (e.g., cross-link interference resources) are quasi co-located (e.g., with respect to spatial parameters of one or more receive beams, with respect to type-D quasi co-location parameters) with one or both of the TCI states. For example, the relatively last received PDSCH transmission (or the relatively last monitored control resource set) may be associated with a first TCI state 510 and a second TCI state 511 and the network may configure the UE to perform the cross-link interference measurements using the first TCI state 510, the second TCI state 511, or both the first TCI state 510 and the second TCI state 511.

In some examples, the UE may perform the cross-link interference measurements using a single TCI state (e.g., a single quasi co-location relationship associated a single TCI state). For example, the network may configure the UE to TDM (e.g., cycle) receive beams for performing the cross-link interference measurements. For example, the network may configure the UE to perform the cross-link interference measurements according to the configuration 505-*a*. In such an example, the UE may perform a first set of cross-link interference measurements based on a quasi co-location relationship associated the first TCI state 510 and a second set of cross-link interference measurements based on a quasi co-location relationship associated the second TCI state 511. For example, the UE may receive PDSCH transmissions from a first network entity (not shown) over one or more a first resource 520 (e.g., a first resource 520-*a* and a first resource 520-*b*) via one or more receive beams 515 (e.g., a receive beam 515-*a* and a receive beam 515-*d*) that may be associated with a first TCI state 510.

Additionally, or alternatively, the UE may receive PDSCH transmissions from a second network entity (not shown) over one or more second resources 521 (e.g., a second resource 521-*a* and a second resource 521-*b*) via one or more other receive beams 515 (e.g., a receive beam 515-*b* and a receive beam 515-*e*) that may be associated with a second TCI state 511. In such an example, the UE may perform the first set of cross-link interference measurements over the cross-link interference resource 522-*a* with a receive beam 515-*c* that may be determined by the UE based on a quasi co-location relationship associated with the first TCI state 510. That is, the UE may perform the first set of cross-link interference measurements using the first TCI state 510. Additionally, or alternatively, the UE may perform the second set of cross-link interference measurements over the cross-link interference resource 522-*b* with a receive beam 515-*f* that may be determined by the UE based on a quasi co-location relationship associated with the second TCI state 511. That is, the UE may perform the second set of cross-link interference measurements using the second TCI state 511.

Additionally, or alternatively, the UE 415-*a* may perform the cross-link interference measurements using two TCI states (e.g., two quasi co-location relationships associated with two TCI states). For example, the network may configure the UE to perform the cross-link interference measurements according to the configuration 505-*b*. In such an example, the UE may perform the cross-link interference measurements based on two quasi co-location relationships, where one of the two quasi co-location relationships is associated with the first TCI state 510 and the other of the two quasi co-location relationships is associated with the second TCI state 511. That is, the UE may use a portion (e.g., half) of the cross-link interference resources to perform cross-link interference measurements using a receive beam associated with the first TCI state 510 and another portion (e.g., half) of the cross-link interference resources to perform cross-link interference measurements using a receive beam associated with the second TCI state 511 (e.g., if the UE is configured with multiple symbols per cross-link interference resource). In such an example, the network may configure the UE with a number of cross-link interference resources that may accommodate (e.g., account for) a gap, such that the UE may switch (e.g., change, alternative) receive beams (e.g., for performing the measurements).

For example, the UE may receive PDSCH transmissions from the first network entity (not shown) over a first resource 520-*c* via a receive beam 515-*g* that may be associated with the first TCI state 510. Additionally, or alternatively, the UE may receive PDSCH transmissions from the second network entity (not shown) over a second resource 521-*c* via a receive beam 515-*h* that may be associated with a second TCI state 511. In such an example, the UE may perform cross-link interference measurements over the cross-link interference resource 522-*c* with a receive beam 515-*i* that may be determined by the UE based on a quasi co-location relationship associated with the first TCI state 510 and the UE may perform cross-link interference measurements over the cross-link interference resource 522-*d* with a receive beam 515-*j* that may be determined by the UE based on a quasi co-location relationship associated with the second TCI state 511.

In some examples, by configuring the UE to perform the cross-link interference measurements according to one or both of the first TCI state 510 and the second TCI state 511, the UE may provide one or more enhancements to cross-link interference mitigation performed by the network, thereby increasing the reliability of communications between the UE and the network, among other benefits.

Figure 6:
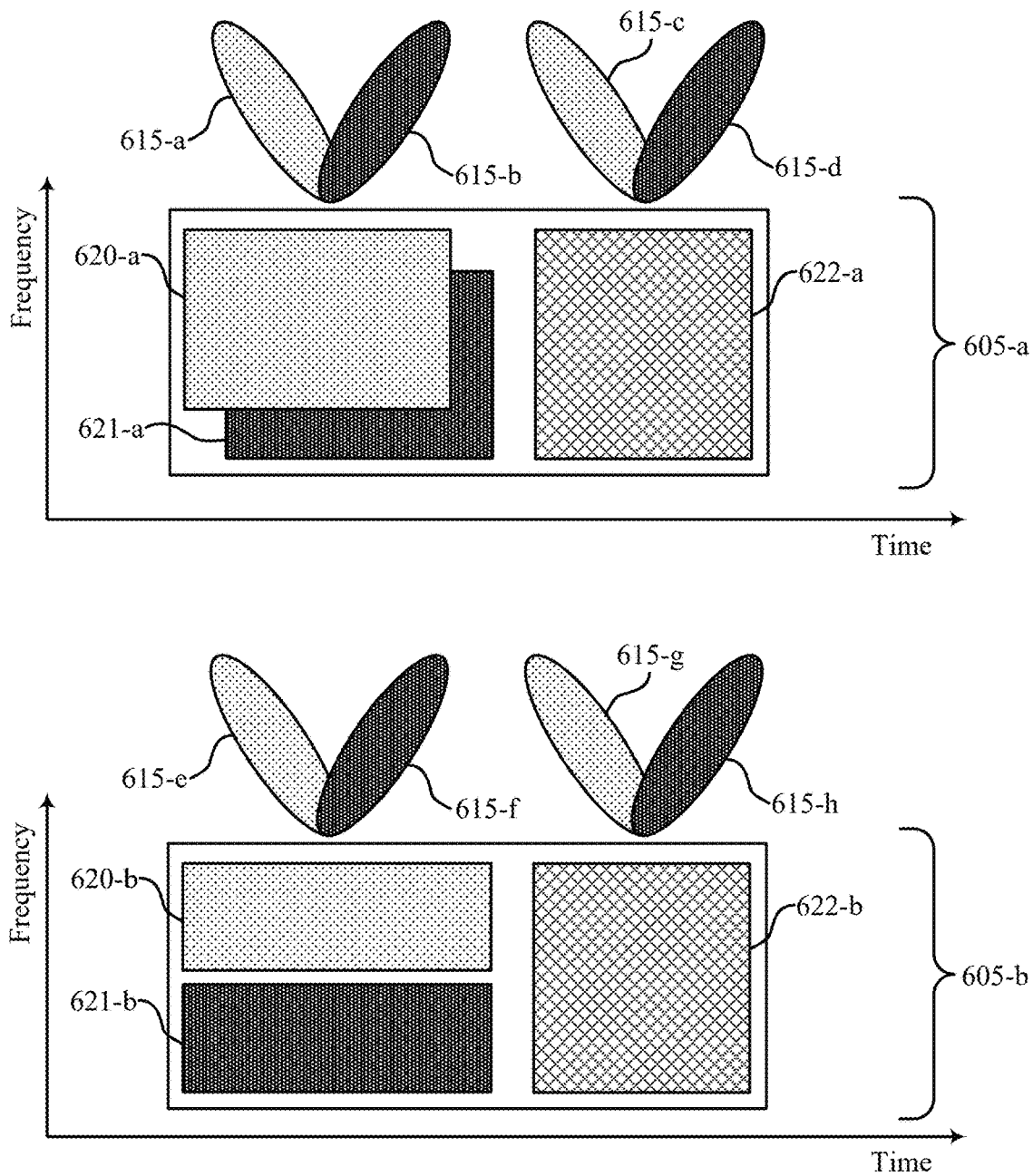

FIG. 6 illustrates an example of a measurement scheme 600 that supports cross-link interference measurement and reporting in a multiple TRP system in accordance with one or more aspects of the present disclosure. In some examples, the measurement scheme 600 may implement aspects of the wireless communications system 100, the wireless communications system 200, the wireless communications systems 300, and the wireless communications system 400. For example, the measurement scheme 600 may be implemented by one or more network entities and one or more UEs, which may be examples of the corresponding devices as described with reference to FIGS. 1, 2, 3A, 3B, and 4. In the example of FIG. 6, the network entities may each be an example of a CU, a DU, an RU, a base station, an IAB node, a TRP, or one or more other network nodes as described with reference to FIG. 1. The measurement scheme 600 may include features for improved communications between the UE and the network, among other benefits.

As illustrated in the example of FIG. 6, the UE may perform cross-link interference measurements according to multiple TCI states. For example, the UE may perform cross-link interference measurements with multiple beams, in which each of the two beams is determined, by the UE, based on a respective quasi co-location relationship associated with a TCI state. For example, the UE may be configured to operate in a multiple TRP mode, such that the UE may simultaneously receive downlink communications (e.g., PDSCH transmissions) from two network entities that may each be associated with a respective TCI state. For example, the UE may simultaneously receive PDSCH transmissions from a first network entity (not shown) over one or more a first resource 620 (e.g., a first resource 620-*a* and a first resource 620-*b*) via one or more receive beams 615 (e.g., a receive beam 615-*a* and a receive beam 615-*e*) that may be associated with a first TCI state 610. Additionally, or alternatively, the UE may receive PDSCH transmissions from a second network entity (not shown) over one or more second resources 621 (e.g., a second resource 621-*a* and a second resource 621-*b*) via one or more receive beams 615 (e.g., a receive beam 615-*b* and a receive beam 615-*f*) that may be associated with a second TCI state 611.

In some examples, the UE may be configured to operate according to an SDM scheme, an SFN scheme, or a multiple DCI PDSCH mode, in which the PDSCH transmission from the first network entity and the second network entity may overlap in time and frequency. In such examples, the first resource 620-*a* and the second resource 621-*a* may overlap in time and frequency and the UE may perform the cross-link interference measurements according the configuration 605-*a*. That is, the UE may perform the cross-link interference measurements over a cross-link interference resource 622-*a* with a receive beam 615-*c* and a receive beam 615-*d*. In some examples, the UE may determine the receive beam 615-*c* based on a quasi co-location relationship associated with the first TCI state 610 and the UE may determine the receive beam 615-*d* based on a quasi co-location relationship associated with the second TCI state 611.

Additionally, or alternatively, in some examples, the UE may be configured to operate according to an FDM scheme (e.g., for receiving the PDSCH transmissions from both the first network entity and the second network entity). In some examples of the FDM scheme, the first resource 620-*b* and the second resource 621-*b* may be overlapping in time and may be non-overlapping in frequency. In such examples, the UE may perform the cross-link interference measurements according to the configuration 605-*b*. For example, the UE may perform the cross-link interference measurements over the cross-link interference resource 622-*b* with a receive beam 615-*g* and a receive beam 615-*h*. In such an example, the UE may determine the receive beam 615-*f* based on a quasi co-location relationship associated with the first TCI state 610 and the UE may determine the receive beam 615-*g* based on a quasi co-location relationship associated with the second TCI state 611. The UE may perform the cross-link interference measurements using a first set of the cross-link interference resources 622-*b* that may be aligned with the first resource 620-*b* of the first TCI state 610 using a first receive beam (e.g., the receive beam 615-*e*). Additionally, or alternatively, the UE may perform the cross-link interference measurements using a second set of the cross-link interference resources 622-*b* that may be aligned with the second resource 621-*b* of the second TCI state 611 using a second receive beam (e.g., the receive beam 615-*f*).

In some examples, by performing the cross-link interference measurements using two receive beams 615 (e.g., each associated with a respective TCI state), the UE may achieve an granularity in the cross-link interference measurements (e.g., an increased granularity of SRS-RSRP measurement).

Figure 7:
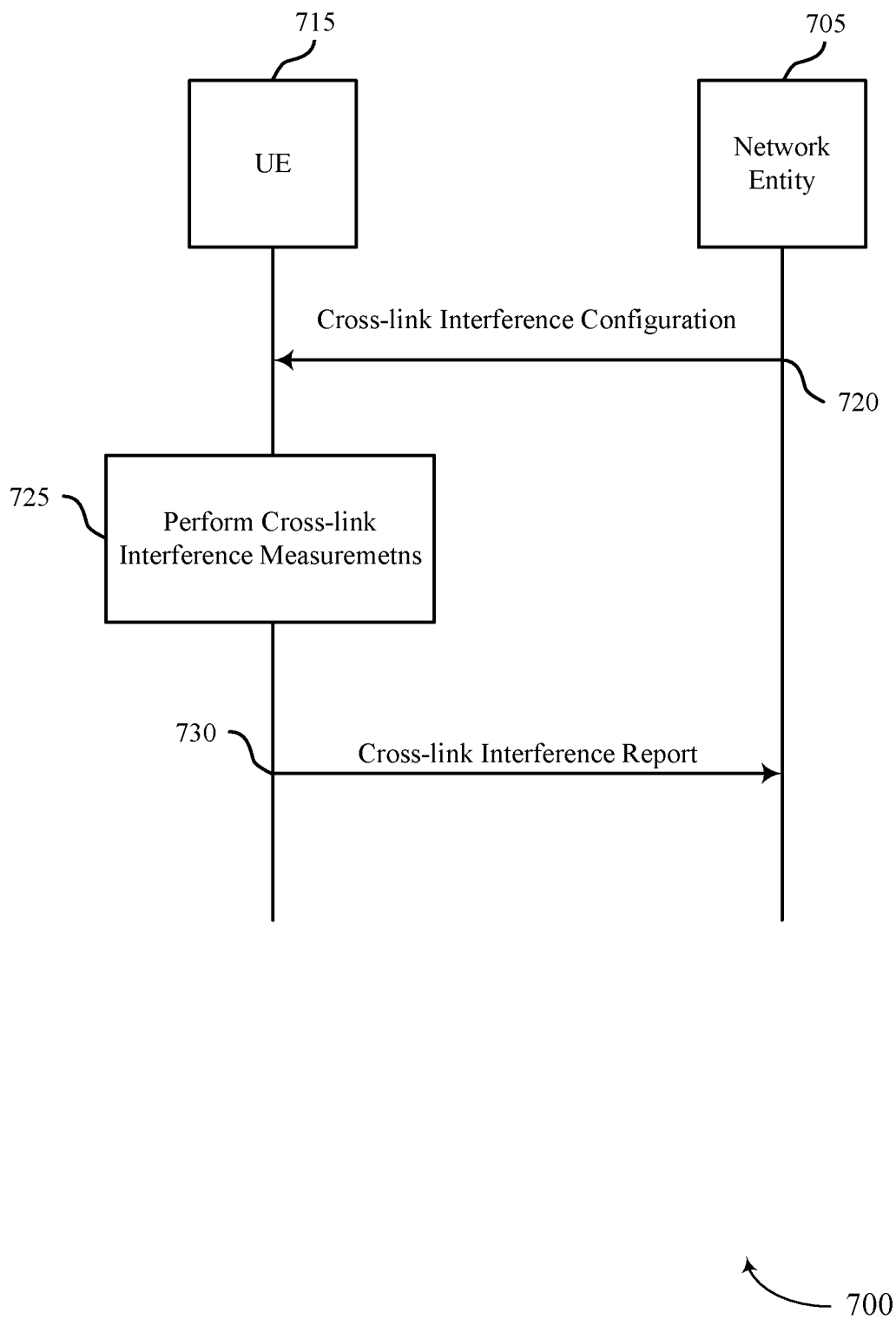
FIG. 7 illustrates an example of a process flow that supports cross-link interference measurement and reporting in a multiple TRP system in accordance with one or more aspects of the present disclosure.

FIG. 7 illustrates an example of a process flow 700 that supports cross-link interference measurement and reporting in a multiple TRP system in accordance with one or more aspects of the present disclosure. The process flow 700 may implement or be implemented by one or more aspects of the wireless communications system 100, the wireless communications system 200, the wireless communications systems 300, and the wireless communications system 400. For example, the process flow 700 may include a network entity 705 and a UE 715, which may be examples of the corresponding devices as described with reference to FIGS. 1, 2, 3A, 3B, and 4. The process flow 700 may be implemented by the network entity 705, the UE 715, or both. In the following description of the process flow 700, operations between the network entity 705 and the UE 715 may occur in a different order or at different times than as shown. Some operations may also be omitted from the process flow 700, and other operations may be added to the process flow 700.

At 720, the UE 715 may receive a message from the network entity 705 indicating a cross-link interference configuration. The cross-link interference configuration may correspond to a configuration for measurement of cross-link interference associated with the UE 715. In some examples, the cross-link interference configuration transmitted at 720 may be an example of a cross-link interference configuration as described with reference to FIG. 2. For example, the cross-link interference configuration may indicate one or more TCI states for the UE 715 to use for performing one or more cross-link interference measurements.

In some examples, the UE 715 may perform the one or more cross-link interference measurements in accordance with the cross-link interference configuration. For example, at 725, the UE 715 may perform the one or more cross-link interference measurements over a set of cross-link interference resources using the one or more TCI states. In some examples, the UE 715 may operate in a multiple TRP framework. In such examples, the UE 715 may perform the cross-link interference measurements (e.g., SRS-RSRP measurements and CLI-RSSI measurements) over multiple occasions (e.g., cross-link interference measurement occasions), in which each cross-link interference measurement occasion includes a portion of the cross-link interference resources. In such examples, the UE 715 may perform the cross-link interference measurements based on one or more quasi co-location relationships and one or more timing offsets that may each be associated with a respective one of the one or more TCI states.

In some examples, the UE 715 may perform the one or more cross-link interference measurements using dual receive beams. For example, the UE 715 may perform the one or more cross-link interference measurements based on two quasi co-location relationships, in which each of the two quasi co-location relationships are associated with a respective one of the one or more TCI states. In such an example, a single cross-link interference metric may be produced. Additionally, or alternatively, the UE 715 may perform the one or more cross-link interference measurements using a single receive beam. For example, the UE 715 may perform the one or more cross-link interference measurements based on a single quasi co-location relationship associated with one TCI state of the one or more TCI states. In such an example, the UE 715 may generate two cross-link interference metrics (e.g., based on two cross-link interference measurement occasions in which the cross-link interference measurements are performed with different quasi co-location relationship). For example, the UE 715 may generate two cross-link interference metrics, in which each cross-link interference metric may be associated with one TRP (e.g., network entity). That is, the UE 715 may generate two cross-link interference metrics, in which each cross-link interference metric may correspond to cross-link interference measurements performed using a receive beam determined using a quasi co-location relationship associated with a TCI state of a TRP. In such an example, the UE 715 may report each of the two cross-link inference metrics or a single (e.g., combined, average) cross-link interference metric. In some examples, if the UE 715 combines the two cross-link interference metrics, the combined cross-link interference metric may correspond to a linear average of the two cross-link interference metrics or filtered average of the two cross-link interference.

In some examples, at 730, the UE may transmit a cross-link interference report indicating one or more cross-link interference metrics corresponding to the one or more cross-link interference measurements. In such an example, if the UE 715 performs two measurements at 725 (e.g., over two cross-link interference resources), and generates two cross-link interference metrics (e.g., one cross-link interference metric per cross-link interference resource), the UE 715 may report the two cross-link interference metrics per cross-link interference resource. Additionally, or alternatively, the UE 715 may report a single (e.g., combined) cross-link interference metric per cross-link interference resource. In some examples, subsequent to performing the cross-link interference measurements, the UE 715 may perform thresholding. For example, the UE 715 may compare each of the two cross-link interference metrics to (e.g., against) a threshold and remove (e.g., drop) one of the cross-link interference metrics prior to transmitting the cross-link interference report at 730 (or prior to averaging the cross-link interference metrics).

In some examples, if the UE 715 reports two cross-link interference metrics (e.g., via the cross-link interference report transmitted at 730), the UE 715 may transmit the cross-link interference measurements according to an ordering. In some examples, the ordering may be based on a value of an identifier of the corresponding TCI state (e.g., a value of the corresponding CORESETPoolIndex IE). That is, the ordering may be based on an order of control resource sets (e.g., a control resource set order) associated with each of the one or more TCI states. In some examples, if the UE 715 reports one or more cross-link interference metrics per the cross-link interference resource, the ordering of the cross-link interference metrics may be based on the value of the identifier of the corresponding TCI state. For example, a first cross-link interference metric may correspond to first TCI state (e.g., a TCI state corresponding to a control resource set in which the CORESETPoolIndex IE is set to 0). Additionally, or alternatively, the ordering may be based on a strength (e.g., value) of the cross-link interference measurements. That is, the UE 715 may transmit the cross-link interference metrics in an ascending order (e.g., and report the associated TCI state in a corresponding order) of the corresponding values.

In some examples, by reporting the one or more cross-link interference metrics at 730, the UE 715 may enhance cross-link interference mitigate techniques performed by the network entity 705, thereby increasing communication reliability between the UE 715 and the network, among other benefits.

Figure 8:
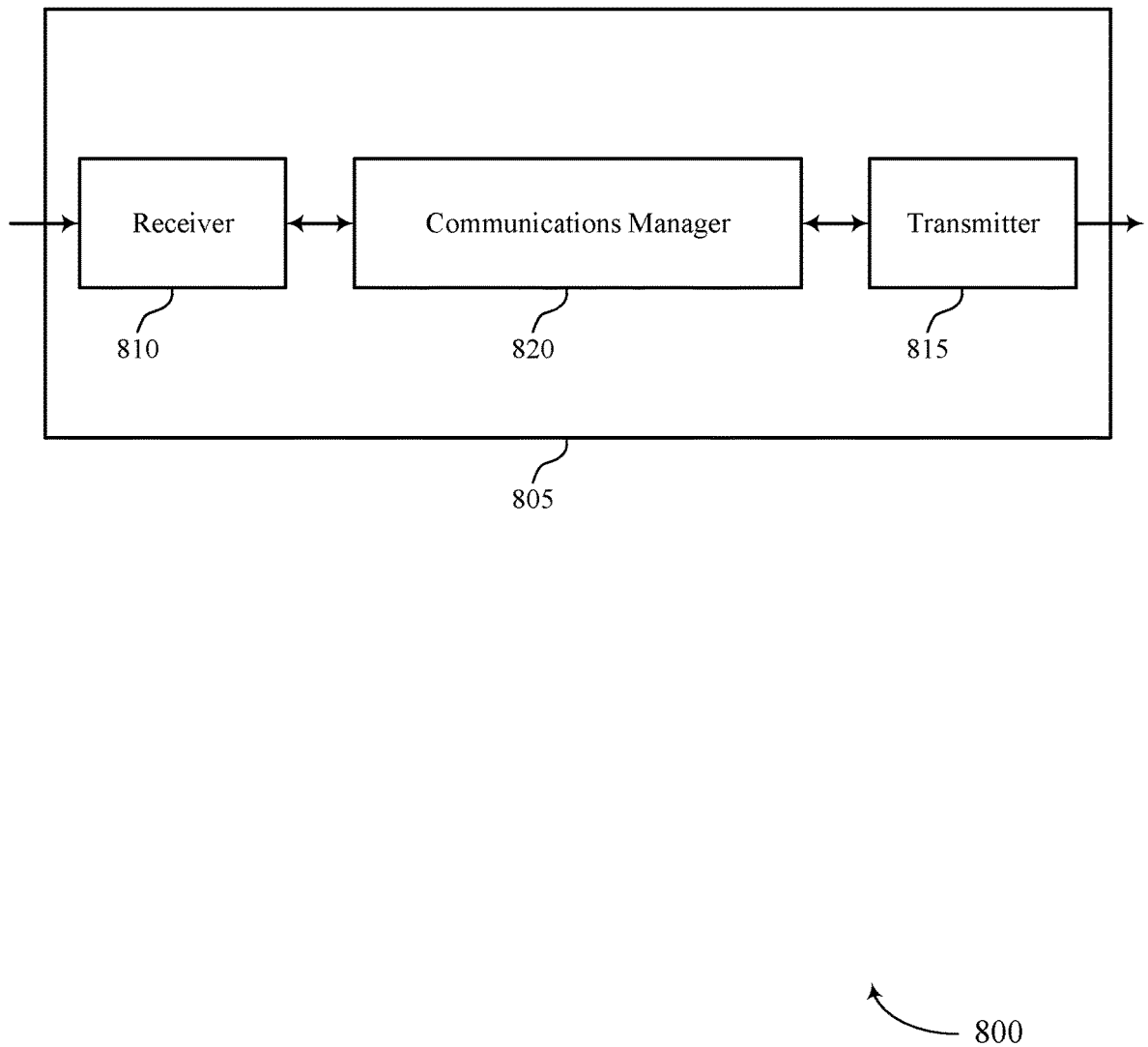
FIGS. 8 and 9 show block diagrams of devices that support cross-link interference measurement and reporting in a multiple TRP system in accordance with one or more aspects of the present disclosure.

FIG. 8 shows a block diagram 800 of a device 805 that supports cross-link interference measurement and reporting in a multiple TRP system in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to cross-link interference measurement and reporting in a multiple TRP system). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to cross-link interference measurement and reporting in a multiple TRP system). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of cross-link interference measurement and reporting in a multiple TRP system as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE (e.g., the device 805) in accordance with examples as disclosed herein. For example, the communications manager 820 may be configured as or otherwise support a means for receiving a message indicating a configuration for measurement of cross-link interference associated with the UE, the configuration indicating one or more TCI states for the UE to use for performing one or more cross-link interference measurements. The communications manager 820 may be configured as or otherwise support a means for performing the one or more cross-link interference measurements over a set of cross-link interference resources using the one or more TCI states in accordance with the configuration. The communications manager 820 may be configured as or otherwise support a means for transmitting a cross-link interference report indicating one or more cross-link interference metrics corresponding to the one or more cross-link interference measurements.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced processing, reduced power consumption, and more efficient utilization of communication resources.

Figure 9:
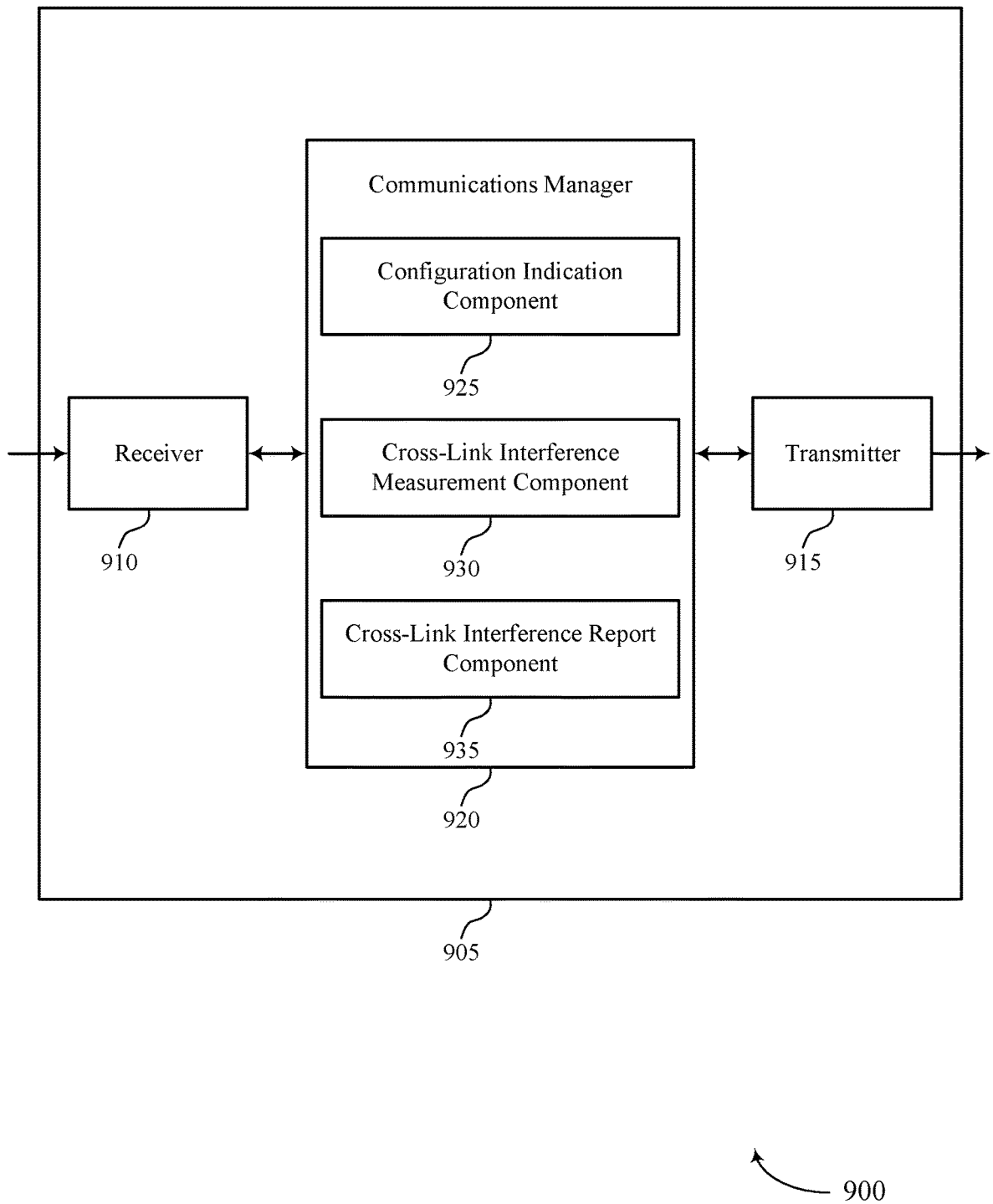

FIG. 9 shows a block diagram 900 of a device 905 that supports cross-link interference measurement and reporting in a multiple TRP system in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to cross-link interference measurement and reporting in a multiple TRP system). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to cross-link interference measurement and reporting in a multiple TRP system). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of cross-link interference measurement and reporting in a multiple TRP system as described herein. For example, the communications manager 920 may include a configuration indication component 925, a cross-link interference measurement component 930, a cross-link interference report component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE (e.g., the device 905) in accordance with examples as disclosed herein. The configuration indication component 925 may be configured as or otherwise support a means for receiving a message indicating a configuration for measurement of cross-link interference associated with the UE, the configuration indicating one or more TCI states for the UE to use for performing one or more cross-link interference measurements. The cross-link interference measurement component 930 may be configured as or otherwise support a means for performing the one or more cross-link interference measurements over a set of cross-link interference resources using the one or more TCI states in accordance with the configuration. The cross-link interference report component 935 may be configured as or otherwise support a means for transmitting a cross-link interference report indicating one or more cross-link interference metrics corresponding to the one or more cross-link interference measurements.

Figure 10:
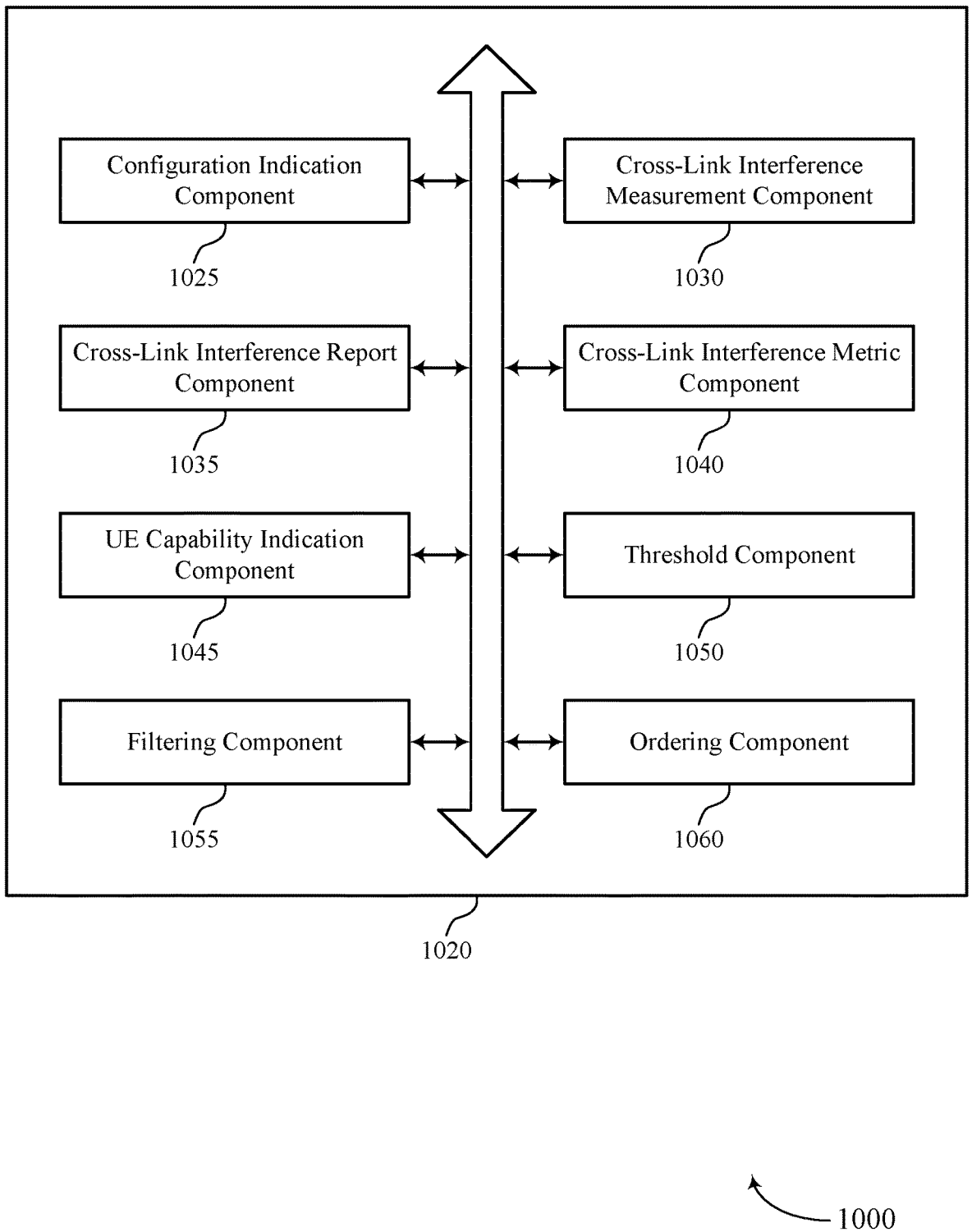
FIG. 10 shows a block diagram of a communications manager that supports cross-link interference measurement and reporting in a multiple TRP system in accordance with one or more aspects of the present disclosure.

FIG. 10 shows a block diagram 1000 of a communications manager 1020 that supports cross-link interference measurement and reporting in a multiple TRP system in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of cross-link interference measurement and reporting in a multiple TRP system as described herein. For example, the communications manager 1020 may include a configuration indication component 1025, a cross-link interference measurement component 1030, a cross-link interference report component 1035, a cross-link interference metric component 1040, a UE capability indication component 1045, a threshold component 1050, a filtering component 1055, an ordering component 1060, or any combination thereof. Each of these components may communicate, directly or indirectly, with one another (e.g., via one or more buses).

The communications manager 1020 may support wireless communication at a UE in accordance with examples as disclosed herein. The configuration indication component 1025 may be configured as or otherwise support a means for receiving a message indicating a configuration for measurement of cross-link interference associated with the UE, the configuration indicating one or more TCI states for the UE to use for performing one or more cross-link interference measurements. The cross-link interference measurement component 1030 may be configured as or otherwise support a means for performing the one or more cross-link interference measurements over a set of cross-link interference resources using the one or more TCI states in accordance with the configuration. The cross-link interference report component 1035 may be configured as or otherwise support a means for transmitting a cross-link interference report indicating one or more cross-link interference metrics corresponding to the one or more cross-link interference measurements.

In some examples, to support receiving the message indicating the configuration for the measurement of the cross-link interference, the configuration indication component 1025 may be configured as or otherwise support a means for receiving a control message indicating one or more cross-link interference resources of the set of cross-link interference resources and one or more control resource sets associated with the one or more cross-link interference resources, where each control resource set of the one or more control resource sets corresponds to a TCI state of the one or more TCI states, and where the control message includes the message.

In some examples, to support receiving the message indicating the configuration for the measurement of the cross-link interference, the configuration indication component 1025 may be configured as or otherwise support a means for receiving a control message via a control resource set, the control message indicating one or more resources for a shared channel message for the UE, where one or both of the control resource set or the shared channel message is associated with two TCI states, and where the one or more cross-link interference measurements are performed based on at least one TCI state of the two TCI states.

In some examples, to support performing the one or more cross-link interference measurements, the cross-link interference measurement component 1030 may be configured as or otherwise support a means for performing the one or more cross-link interference measurements based on a single quasi co-location relationship associated with the at least one TCI state of the two TCI states.

In some examples, to support performing the one or more cross-link interference measurements, the cross-link interference measurement component 1030 may be configured as or otherwise support a means for performing the one or more cross-link interference measurements based on a quasi co-location relationship associated with a TCI state of the at least one TCI state, the TCI state corresponding to a lowest TCI state identifier or a highest TCI state identifier of the at least one TCI state.

In some examples, to support performing the one or more cross-link interference measurements, the cross-link interference measurement component 1030 may be configured as or otherwise support a means for performing a first one or more cross-link interference measurements based on a first quasi co-location relationship associated with a first TCI state of the at least one TCI state over a first one or more cross-link interference resources of the set of cross-link interference resources and a second one or more cross-link interference measurements based on a second quasi co-location relationship associated with a second TCI state of the at least one TCI state over a second one or more cross-link interference resources of the set of cross-link interference resources.

In some examples, to support performing the one or more cross-link interference measurements, the cross-link interference measurement component 1030 may be configured as or otherwise support a means for performing the one or more cross-link interference measurements based on two quasi co-location relationships, where each of the two quasi co-location relationships are associated with a respective one of the at least one TCI state of the two TCI states.

In some examples, the configuration includes an indication of one or more time offsets for performing the one or more cross-link interference measurements, the one or more time offsets being associated with the one or more TCI states. In some examples, the one or more time offsets are associated with two TCI states of the one or more TCI states. In some examples, the one or more time offsets include a metric based on a maximum timing advance value, a minimum timing advanced value, or an average timing advance value.

In some examples, to support performing the one or more cross-link interference measurements, the cross-link interference measurement component 1030 may be configured as or otherwise support a means for performing the one or more cross-link interference measurements based on a first quasi co-location relationship associated with a first TCI state of the one or more TCI states and a second TCI state of the one or more TCI states, where the first TCI state corresponds to a first beam and the second TCI state corresponds to a second beam. In some examples, to support performing the one or more cross-link interference measurements, the cross-link interference metric component 1040 may be configured as or otherwise support a means for generating a single cross-link interference metric based on the one or more cross-link interference measurements, where the cross-link interference report indicates the single cross-link interference metric.

In some examples, to support performing the one or more cross-link interference measurements, the cross-link interference measurement component 1030 may be configured as or otherwise support a means for performing a first one or more cross-link interference measurements over a first one or more cross-link interference resources of the set of cross-link interference resources based on a first quasi co-location relationship associated with a first TCI state of the one or more TCI states and a second one or more cross-link interference measurements over a second one or more cross-link interference resources of the set of cross-link interference resources based on a second quasi co-location relationship associated with a second TCI state of the one or more TCI states, where the first TCI state corresponds to a first beam and the second TCI state corresponds to a second beam, and where the first one or more cross-link interference measurements and the second one or more cross-link interference measurements are each performed with both the first beam and the second beam. In some examples, to support performing the one or more cross-link interference measurements, the cross-link interference metric component 1040 may be configured as or otherwise support a means for generating a first two cross-link interference metrics based on the first one or more cross-link interference measurements and a second two cross-link interference metrics based on the second one or more cross-link interference measurements, where one of the first two cross-link interference metrics and one of the second two cross-link interference metrics correspond to the first beam and the second beam.

In some examples, to support transmitting the cross-link interference report, the cross-link interference report component 1035 may be configured as or otherwise support a means for transmitting the cross-link interference report, where the cross-link interference report indicates one of the first two cross-link interference metrics and one of the second two cross-link interference metrics, both of the first two cross-link interference metrics and both of the second two cross-link interference metrics, an average of one of the first two cross-link interference metrics and one of the second two cross-link interference metrics, or an average of the first two cross-link interference metrics and the second two cross-link interference metrics.

In some examples, the threshold component 1050 may be configured as or otherwise support a means for comparing each of the first two cross-link interference metrics and each of the second two cross-link interference metrics to a threshold. In some examples, the threshold component 1050 may be configured as or otherwise support a means for dropping a first one of the first two cross-link interference metrics and a first one of the second two cross-link interference metrics based on determining that the first one of the first two cross-link interference metrics and the first one of the second two cross-link interference metrics fail to satisfy the threshold, where the cross-link interference report indicates a second one of the first two cross-link interference metrics and a second one of the second two cross-link interference metrics or an average of the second one of the first two cross-link interference metrics and the second one of the second two cross-link interference metrics.

In some examples, the ordering component 1060 may be configured as or otherwise support a means for determining an order of the first two cross-link interference metrics and the second two cross-link interference metrics based on a TCI state order of the first TCI state and the second TCI state, a control resource set order associated with each of the first TCI state and the second TCI state, or a value corresponding to each of the first two cross-link interference metrics and each of the second two cross-link interference metrics, where the cross-link interference report includes an indication of the order.

In some examples, to support transmitting the cross-link interference report, the filtering component 1055 may be configured as or otherwise support a means for filtering the first two cross-link interference metrics and the second two cross-link interference metrics. In some examples, to support transmitting the cross-link interference report, the cross-link interference report component 1035 may be configured as or otherwise support a means for transmitting the cross-link interference report, where the cross-link interference report indicates the first two cross-link interference metrics, the second two cross-link interference metrics, a linear average of the first two cross-link interference metrics and the second two cross-link interference metrics, a filtered average of the first two cross-link interference metrics and the second two cross-link interference metrics, or both a linear average and filtered average of the first two cross-link interference metrics and the second two cross-link interference metrics. In some examples, the cross-link interference report indicates the first two cross-link interference metrics based on a value associated with the first two cross-link interference metrics being greater than a value associated with the second two cross-link interference metrics.

In some examples, to support filtering the first two cross-link interference metrics and the second two cross-link interference metrics, the filtering component 1055 may be configured as or otherwise support a means for filtering the first two cross-link interference metrics and the second two cross-link interference metrics using a first filtering coefficient for the first two cross-link interference metrics and a second filtering coefficient for the second two cross-link interference metrics or a third filtering coefficient for both the first two cross-link interference metrics and the second two cross-link interference metrics.

In some examples, the UE capability indication component 1045 may be configured as or otherwise support a means for transmitting an indication of a UE capability associated with performing the one or more cross-link interference measurements, where the set of cross-link interference resources is based on the UE capability.

Figure 11:
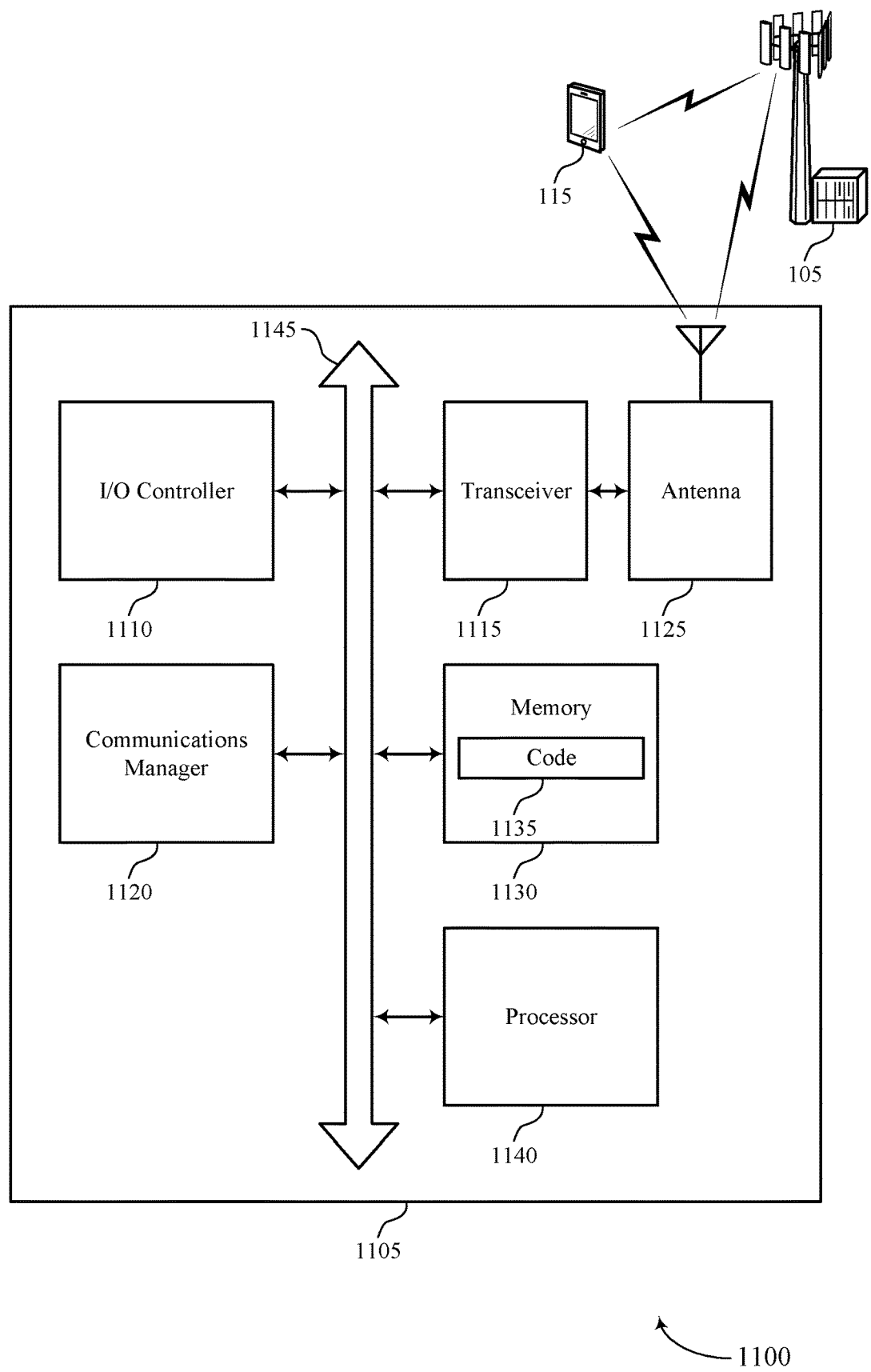
FIG. 11 shows a diagram of a system including a device that supports cross-link interference measurement and reporting in a multiple TRP system in accordance with one or more aspects of the present disclosure.

FIG. 11 shows a diagram of a system 1100 including a device 1105 that supports cross-link interference measurement and reporting in a multiple TRP system in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting cross-link interference measurement and reporting in a multiple TRP system). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at a UE (e.g., the device 1105) in accordance with examples as disclosed herein. For example, the communications manager 1120 may be configured as or otherwise support a means for receiving a message indicating a configuration for measurement of cross-link interference associated with the UE, the configuration indicating one or more TCI states for the UE to use for performing one or more cross-link interference measurements. The communications manager 1120 may be configured as or otherwise support a means for performing the one or more cross-link interference measurements over a set of cross-link interference resources using the one or more TCI states in accordance with the configuration. The communications manager 1120 may be configured as or otherwise support a means for transmitting a cross-link interference report indicating one or more cross-link interference metrics corresponding to the one or more cross-link interference measurements.

By including or configuring the communications manager 1120 in accordance with examples as described herein, the device 1105 may support techniques for improved communication reliability, reduced latency, more efficient utilization of communication resources and improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of cross-link interference measurement and reporting in a multiple TRP system as described herein, or the processor 1140 and the memory 1130 may be otherwise configured to perform or support such operations.

Figure 12:
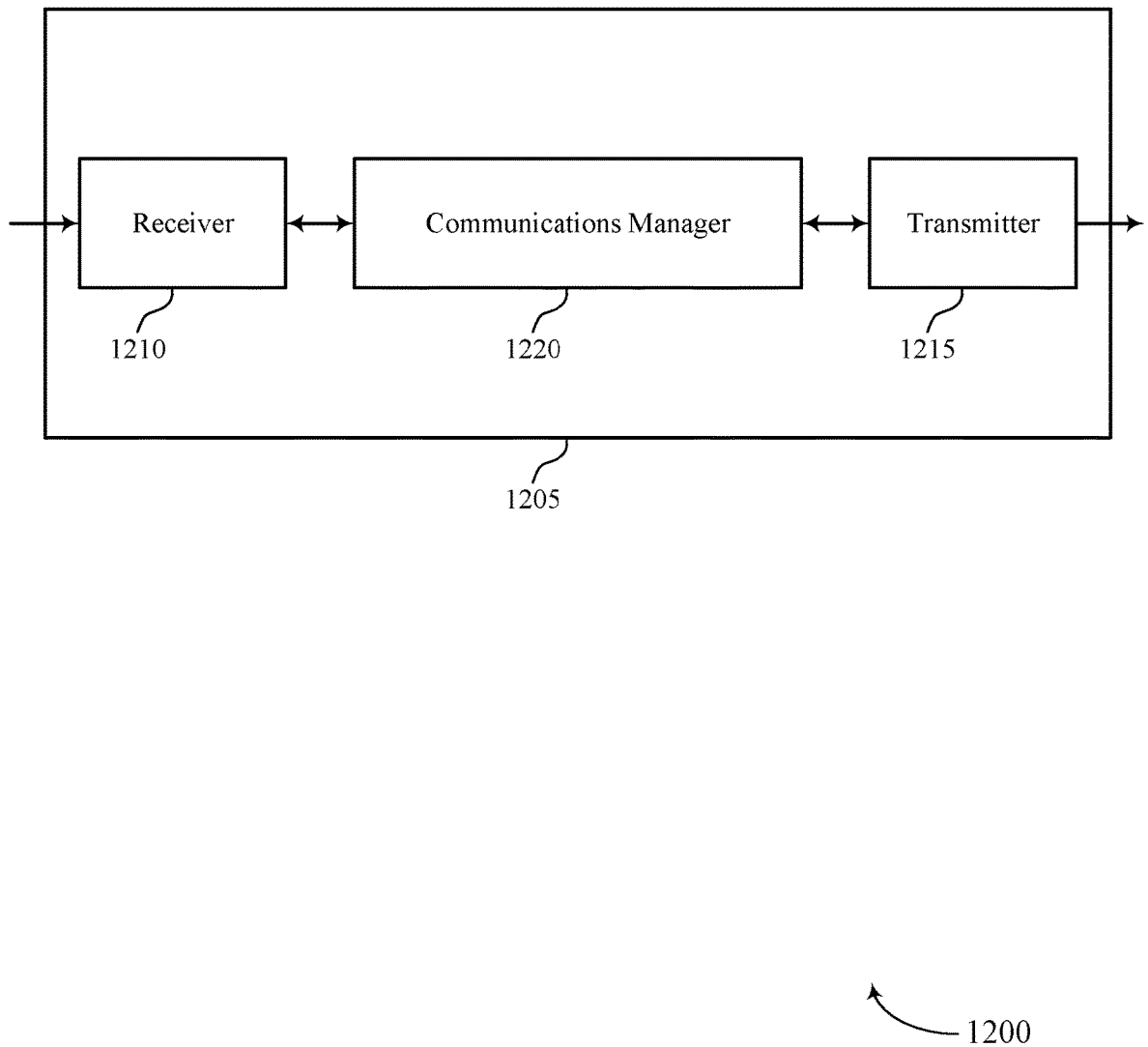
FIGS. 12 and 13 show block diagrams of devices that support cross-link interference measurement and reporting in a multiple TRP system in accordance with one or more aspects of the present disclosure.

FIG. 12 shows a block diagram 1200 of a device 1205 that supports cross-link interference measurement and reporting in a multiple TRP system in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of cross-link interference measurement and reporting in a multiple TRP system as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity (e.g., device 1205) in accordance with examples as disclosed herein. For example, the communications manager 1220 may be configured as or otherwise support a means for transmitting a message indicating a configuration for measurement of cross-link interference associated with a UE, the configuration indicating one or more TCI states for performing one or more cross-link interference measurements over a set of cross-link interference resources using the one or more TCI states in accordance with the configuration. The communications manager 1220 may be configured as or otherwise support a means for receiving a cross-link interference report indicating one or more cross-link interference metrics corresponding to the one or more cross-link interference measurements.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for reduced processing and more efficient utilization of communication resources.

Figure 13:
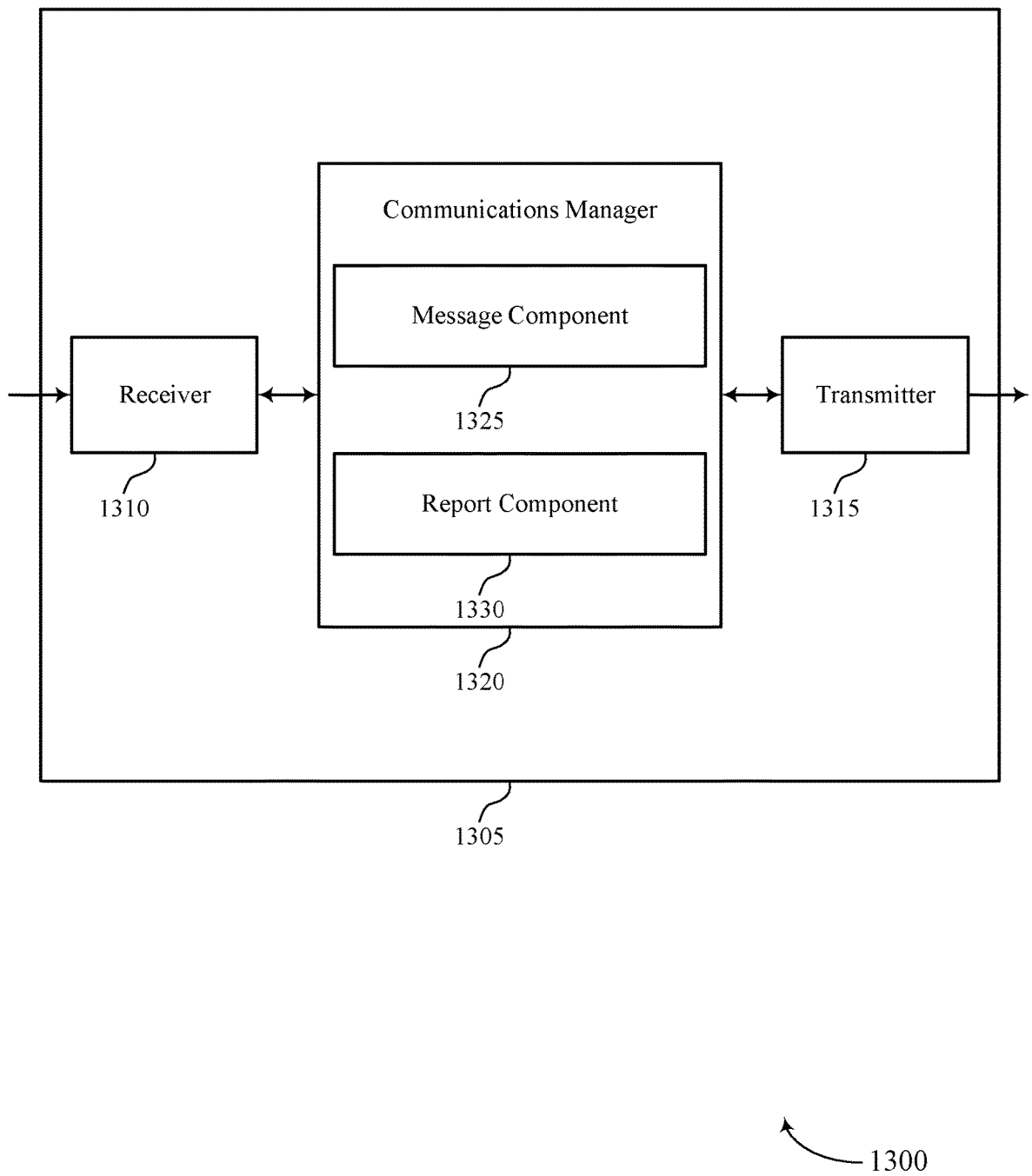

FIG. 13 shows a block diagram 1300 of a device 1305 that supports cross-link interference measurement and reporting in a multiple TRP system in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of cross-link interference measurement and reporting in a multiple TRP system as described herein. For example, the communications manager 1320 may include a message component 1325 a report component 1330, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a network entity (e.g., the device 1305) in accordance with examples as disclosed herein. The message component 1325 may be configured as or otherwise support a means for transmitting a message indicating a configuration for measurement of cross-link interference associated with a UE, the configuration indicating one or more TCI states for performing one or more cross-link interference measurements over a set of cross-link interference resources using the one or more TCI states in accordance with the configuration. The report component 1330 may be configured as or otherwise support a means for receiving a cross-link interference report indicating one or more cross-link interference metrics corresponding to the one or more cross-link interference measurements.

Figure 14:
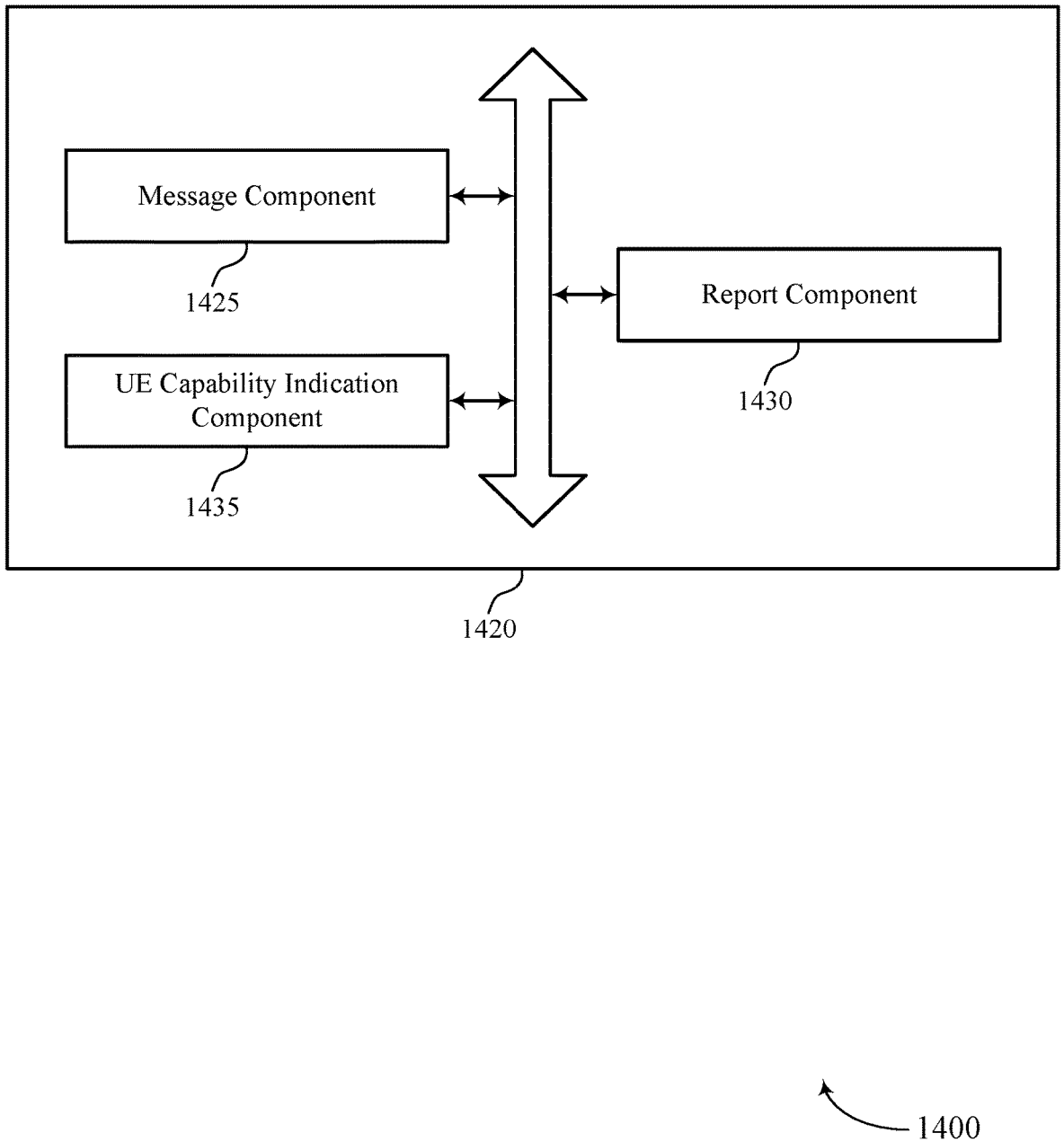
FIG. 14 shows a block diagram of a communications manager that supports cross-link interference measurement and reporting in a multiple TRP system in accordance with one or more aspects of the present disclosure.

FIG. 14 shows a block diagram 1400 of a communications manager 1420 that supports cross-link interference measurement and reporting in a multiple TRP system in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of cross-link interference measurement and reporting in a multiple TRP system as described herein. For example, the communications manager 1420 may include a message component 1425, a report component 1430, a UE capability indication component 1435, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communication at a network entity in accordance with examples as disclosed herein. The message component 1425 may be configured as or otherwise support a means for transmitting a message indicating a configuration for measurement of cross-link interference associated with a UE, the configuration indicating one or more TCI states for performing one or more cross-link interference measurements over a set of cross-link interference resources using the one or more TCI states in accordance with the configuration. The report component 1430 may be configured as or otherwise support a means for receiving a cross-link interference report indicating one or more cross-link interference metrics corresponding to the one or more cross-link interference measurements.

In some examples, to support transmitting the message indicating the configuration for the measurement of the cross-link interference, the message component 1425 may be configured as or otherwise support a means for transmitting a control message indicating one or more cross-link interference resources of the set of cross-link interference resources and one or more control resource sets associated with the one or more cross-link interference resources, where each control resource set of the one or more control resource sets corresponds to a TCI state of the one or more TCI states, and where the control message includes the message.

In some examples, to support transmitting the message indicating the configuration for the measurement of the cross-link interference, the message component 1425 may be configured as or otherwise support a means for transmitting a control message via a control resource set, the control message indicating one or more resources for a shared channel message, where one or both of the control resource set or the shared channel message is associated with two TCI states.

In some examples, the configuration includes an indication of one or more time offsets for performing the one or more cross-link interference measurements, the one or more time offsets being associated with the one or more TCI states. In some examples, the one or more time offsets are associated with two TCI states of the one or more TCI states. In some examples, the one or more time offsets include a metric based on a maximum timing advance value, a minimum timing advanced value, or an average timing advance value.

In some examples, to support receiving the cross-link interference report, the report component 1430 may be configured as or otherwise support a means for receiving the cross-link interference report, where the cross-link interference report indicates at least one of a first two cross-link interference metrics based on a first one or more cross-link interference measurements and a second two cross-link interference metrics based on a second one or more cross-link interference measurements, the first one or more cross-link interference measurements are associated with a first TCI state of the one or more TCI states and the second one or more cross-link interference measurements are associated with a second TCI state of the one or more TCI states, where the first TCI state corresponds to a first beam and the second TCI state corresponds to a second beam, and where the first one or more cross-link interference measurements and the second one or more cross-link interference measurements are based on both the first beam and the second beam.

In some examples, the cross-link interference report indicates one of the first two cross-link interference metrics and one of the second two cross-link interference metrics, both of the first two cross-link interference metrics and both of the second two cross-link interference metrics, an average of one of the first two cross-link interference metrics and one of the second two cross-link interference metrics, or an average of the first two cross-link interference metrics and the second two cross-link interference metrics.

In some examples, the cross-link interference report indicates the first two cross-link interference metrics, the second two cross-link interference metrics, a linear average of the first two cross-link interference metrics and the second two cross-link interference metrics, a filtered average of the first two cross-link interference metrics and the second two cross-link interference metrics, or both a linear average and filtered average of the first two cross-link interference metrics and the second two cross-link interference metrics.

In some examples, the cross-link interference report indicates the first two cross-link interference metrics based on a value associated with the first two cross-link interference metrics being greater than a value associated with the second two cross-link interference metrics. In some examples, the UE capability indication component 1435 may be configured as or otherwise support a means for receiving an indication of a UE capability associated with performing the one or more cross-link interference measurements, where the set of cross-link interference resources is based on the UE capability.

Figure 15:
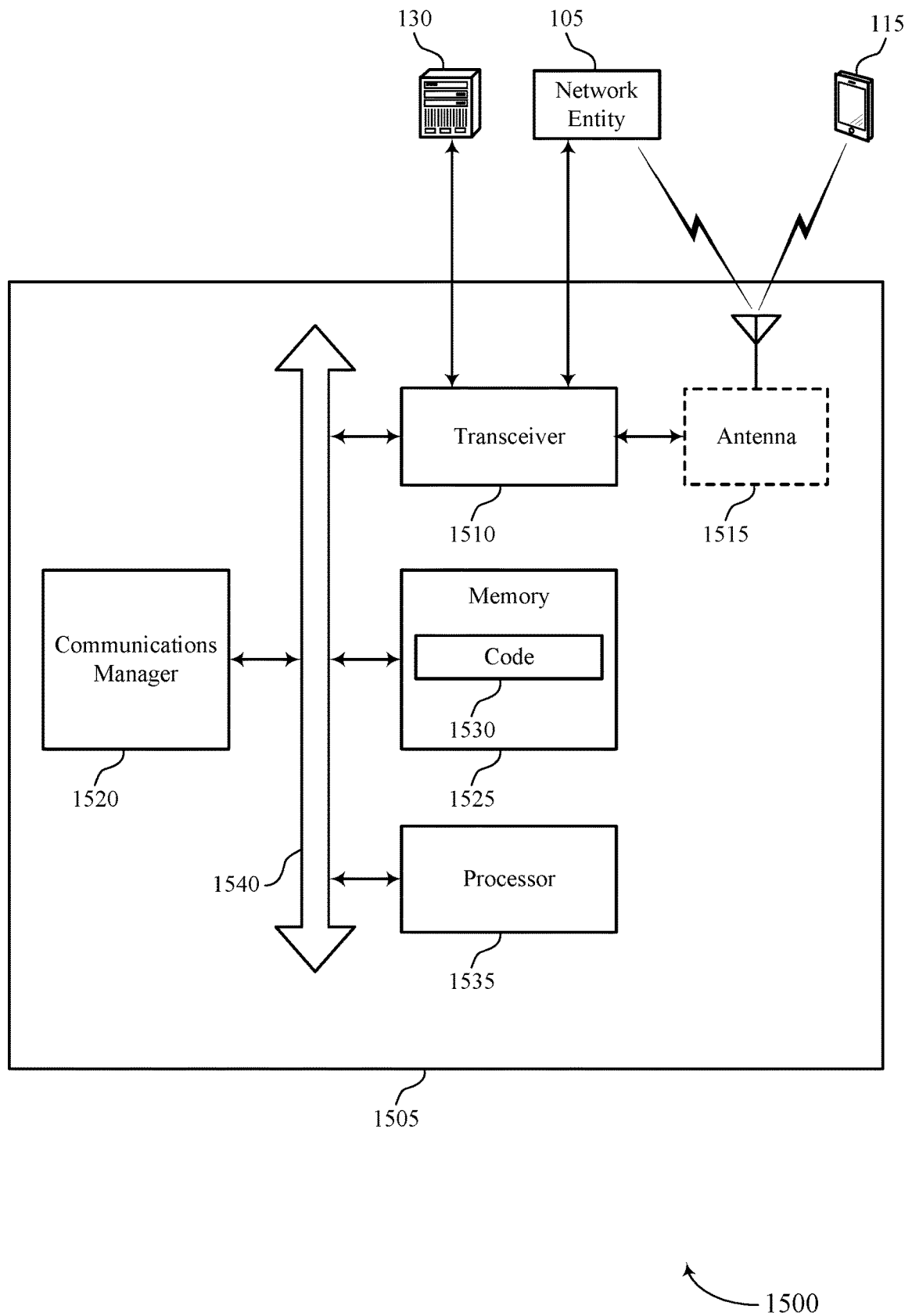
FIG. 15 shows a diagram of a system including a device that supports cross-link interference measurement and reporting in a multiple TRP system in accordance with one or more aspects of the present disclosure.

FIG. 15 shows a diagram of a system 1500 including a device 1505 that supports cross-link interference measurement and reporting in a multiple TRP system in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. The transceiver 1510, or the transceiver 1510 and one or more antennas 1515 or wired interfaces, where applicable, may be an example of a transmitter 1215, a transmitter 1315, a receiver 1210, a receiver 1310, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting cross-link interference measurement and reporting in a multiple TRP system). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communication at a network entity (e.g., the device 1505) in accordance with examples as disclosed herein. For example, the communications manager 1520 may be configured as or otherwise support a means for transmitting a message indicating a configuration for measurement of cross-link interference associated with a UE, the configuration indicating one or more TCI states for performing one or more cross-link interference measurements over a set of cross-link interference resources using the one or more TCI states in accordance with the configuration. The communications manager 1520 may be configured as or otherwise support a means for receiving a cross-link interference report indicating one or more cross-link interference metrics corresponding to the one or more cross-link interference measurements.

By including or configuring the communications manager 1520 in accordance with examples as described herein, the device 1505 may support techniques for improved communication reliability, more efficient utilization of communication resources, and improved utilization of processing capability.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the processor 1535, the memory 1525, the code 1530, the transceiver 1510, or any combination thereof. For example, the code 1530 may include instructions executable by the processor 1535 to cause the device 1505 to perform various aspects of cross-link interference measurement and reporting in a multiple TRP system as described herein, or the processor 1535 and the memory 1525 may be otherwise configured to perform or support such operations.

Figure 16:
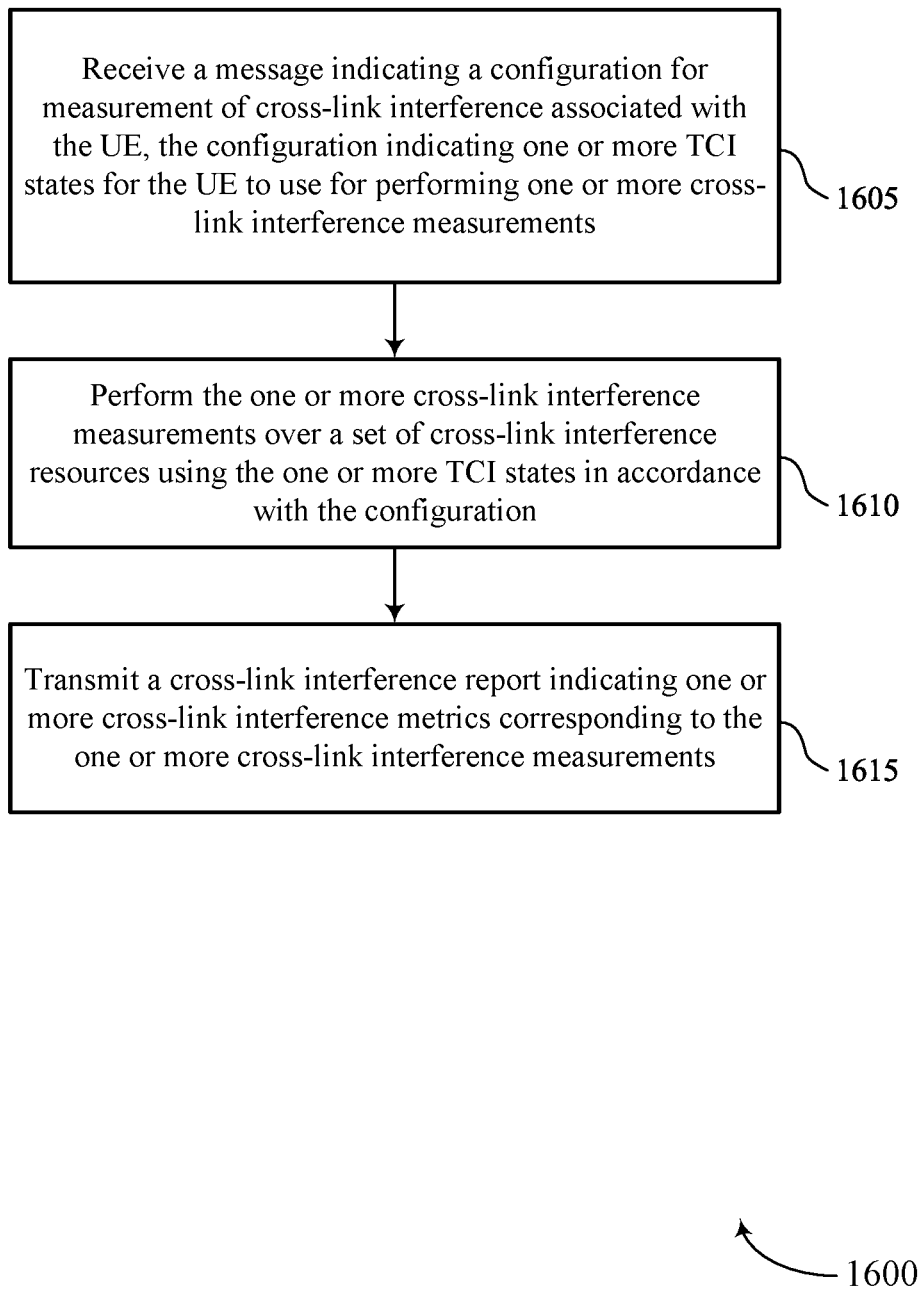
FIGS. 16 through 21 show flowcharts illustrating methods that support cross-link interference measurement and reporting in a multiple TRP system in accordance with one or more aspects of the present disclosure.

FIG. 16 shows a flowchart illustrating a method 1600 that supports cross-link interference measurement and reporting in a multiple TRP system in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving a message indicating a configuration for measurement of cross-link interference associated with the UE, the configuration indicating one or more TCI states for the UE to use for performing one or more cross-link interference measurements. The operations of 1605 may be performed in accordance with examples as disclosed herein. In some examples, aspects of the operations of 1605 may be performed by a configuration indication component 1025 as described with reference to FIG. 10.

At 1610, the method may include performing the one or more cross-link interference measurements over a set of cross-link interference resources using the one or more TCI states in accordance with the configuration. The operations of 1610 may be performed in accordance with examples as disclosed herein. In some examples, aspects of the operations of 1610 may be performed by a cross-link interference measurement component 1030 as described with reference to FIG. 10.

At 1615, the method may include transmitting a cross-link interference report indicating one or more cross-link interference metrics corresponding to the one or more cross-link interference measurements. The operations of 1615 may be performed in accordance with examples as disclosed herein. In some examples, aspects of the operations of 1615 may be performed by a cross-link interference report component 1035 as described with reference to FIG. 10.

Figure 17:
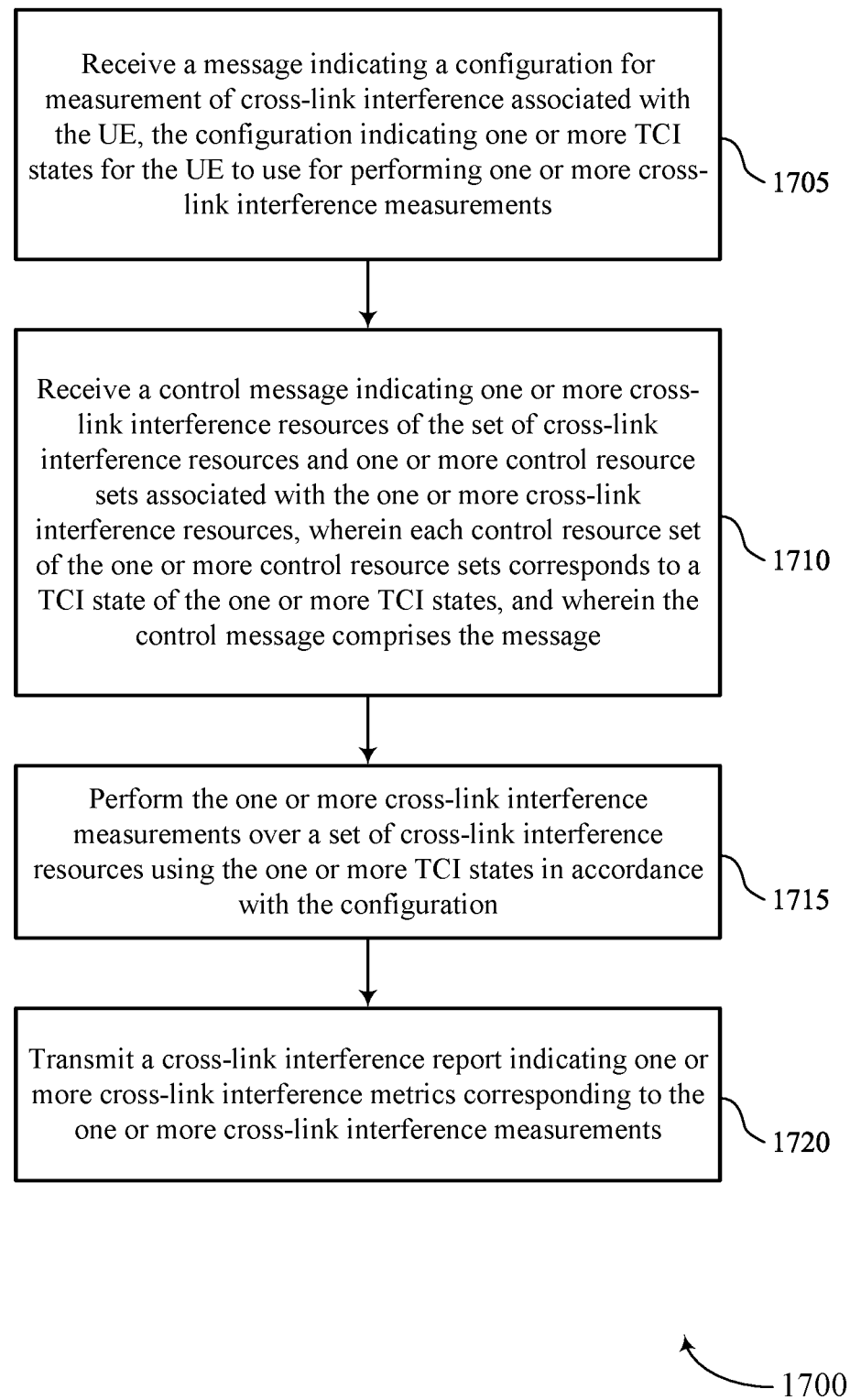

FIG. 17 shows a flowchart illustrating a method 1700 that supports cross-link interference measurement and reporting in a multiple TRP system in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving a message indicating a configuration for measurement of cross-link interference associated with the UE, the configuration indicating one or more TCI states for the UE to use for performing one or more cross-link interference measurements. The operations of 1705 may be performed in accordance with examples as disclosed herein. In some examples, aspects of the operations of 1705 may be performed by a configuration indication component 1025 as described with reference to FIG. 10.

At 1710, the method may include receiving a control message indicating one or more cross-link interference resources of the set of cross-link interference resources and one or more control resource sets associated with the one or more cross-link interference resources, where each control resource set of the one or more control resource sets corresponds to a TCI state of the one or more TCI states, and where the control message includes the message. The operations of 1710 may be performed in accordance with examples as disclosed herein. In some examples, aspects of the operations of 1710 may be performed by a configuration indication component 1025 as described with reference to FIG. 10.

At 1715, the method may include performing the one or more cross-link interference measurements over a set of cross-link interference resources using the one or more TCI states in accordance with the configuration. The operations of 1715 may be performed in accordance with examples as disclosed herein. In some examples, aspects of the operations of 1715 may be performed by a cross-link interference measurement component 1030 as described with reference to FIG. 10.

At 1720, the method may include transmitting a cross-link interference report indicating one or more cross-link interference metrics corresponding to the one or more cross-link interference measurements. The operations of 1720 may be performed in accordance with examples as disclosed herein. In some examples, aspects of the operations of 1720 may be performed by a cross-link interference report component 1035 as described with reference to FIG. 10.

Figure 18:
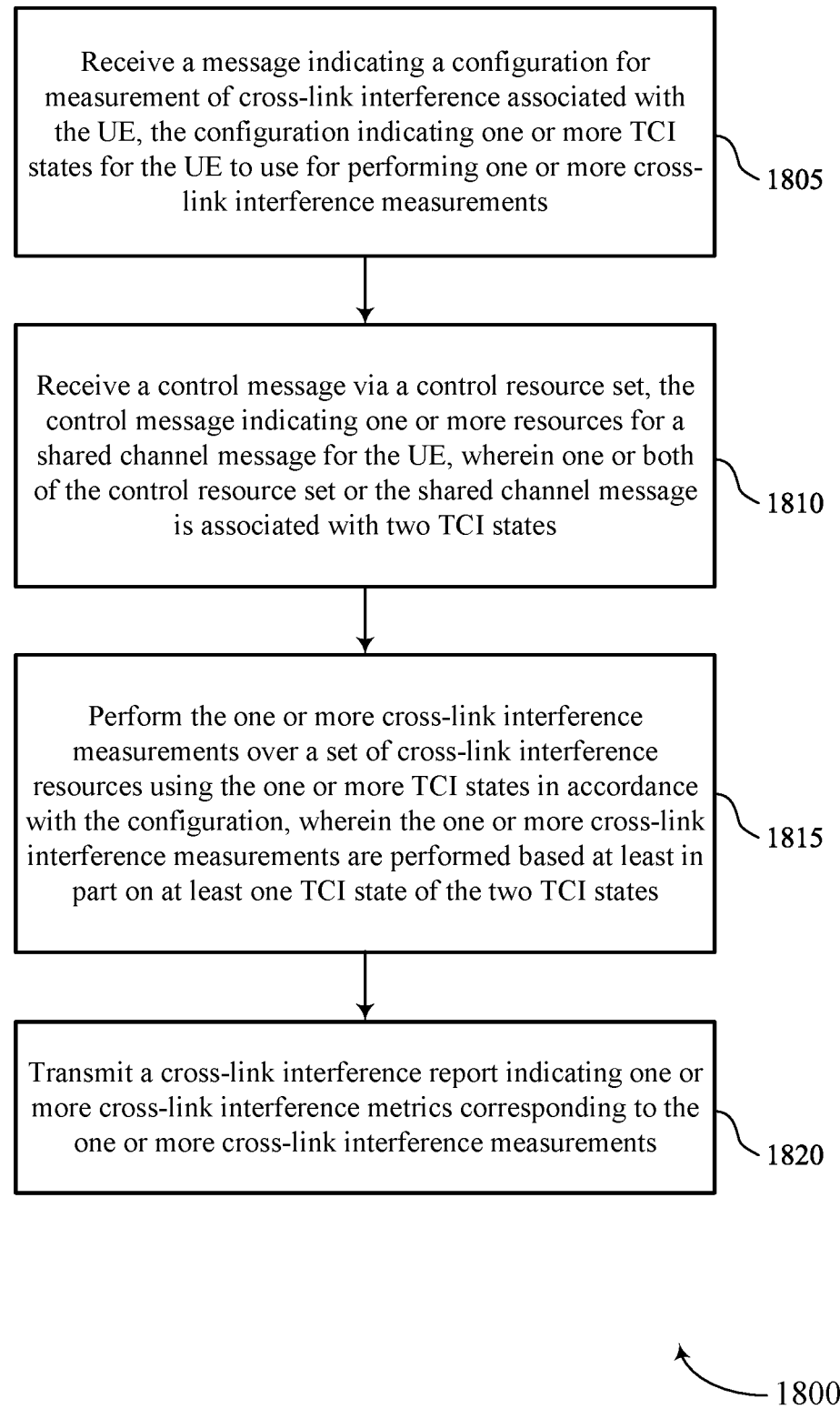

FIG. 18 shows a flowchart illustrating a method 1800 that supports cross-link interference measurement and reporting in a multiple TRP system in accordance with one or more aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include receiving a message indicating a configuration for measurement of cross-link interference associated with the UE, the configuration indicating one or more TCI states for the UE to use for performing one or more cross-link interference measurements. The operations of 1805 may be performed in accordance with examples as disclosed herein. In some examples, aspects of the operations of 1805 may be performed by a configuration indication component 1025 as described with reference to FIG. 10.

At 1810, the method may include receiving a control message via a control resource set, the control message indicating one or more resources for a shared channel message for the UE, where one or both of the control resource set or the shared channel message is associated with two TCI states. The operations of 1810 may be performed in accordance with examples as disclosed herein. In some examples, aspects of the operations of 1810 may be performed by a configuration indication component 1025 as described with reference to FIG. 10.

At 1815, the method may include performing the one or more cross-link interference measurements over a set of cross-link interference resources using the one or more TCI states in accordance with the configuration, where the one or more cross-link interference measurements are performed based on at least one TCI state of the two TCI states. The operations of 1815 may be performed in accordance with examples as disclosed herein. In some examples, aspects of the operations of 1815 may be performed by a cross-link interference measurement component 1030 as described with reference to FIG. 10.

At 1820, the method may include transmitting a cross-link interference report indicating one or more cross-link interference metrics corresponding to the one or more cross-link interference measurements. The operations of 1820 may be performed in accordance with examples as disclosed herein. In some examples, aspects of the operations of 1820 may be performed by a cross-link interference report component 1035 as described with reference to FIG. 10.

Figure 19:
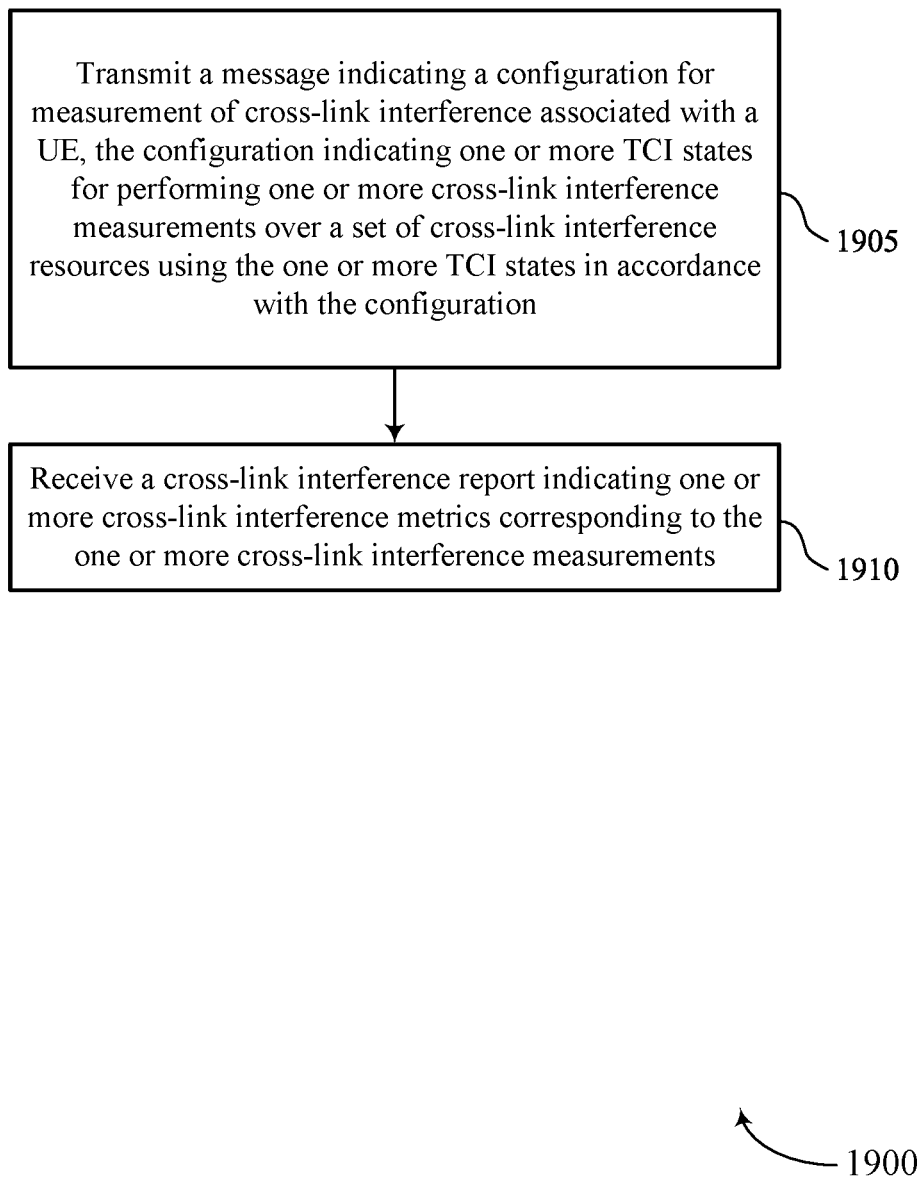

FIG. 19 shows a flowchart illustrating a method 1900 that supports cross-link interference measurement and reporting in a multiple TRP system in accordance with one or more aspects of the present disclosure. The operations of the method 1900 may be implemented by a network entity or its components as described herein. For example, the operations of the method 1900 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1905, the method may include transmitting a message indicating a configuration for measurement of cross-link interference associated with a UE, the configuration indicating one or more TCI states for performing one or more cross-link interference measurements over a set of cross-link interference resources using the one or more TCI states in accordance with the configuration. The operations of 1905 may be performed in accordance with examples as disclosed herein. In some examples, aspects of the operations of 1905 may be performed by a message component 1425 as described with reference to FIG. 14.

At 1910, the method may include receiving a cross-link interference report indicating one or more cross-link interference metrics corresponding to the one or more cross-link interference measurements. The operations of 1910 may be performed in accordance with examples as disclosed herein.

In some examples, aspects of the operations of 1910 may be performed by a report component 1430 as described with reference to FIG. 14.

Figure 20:
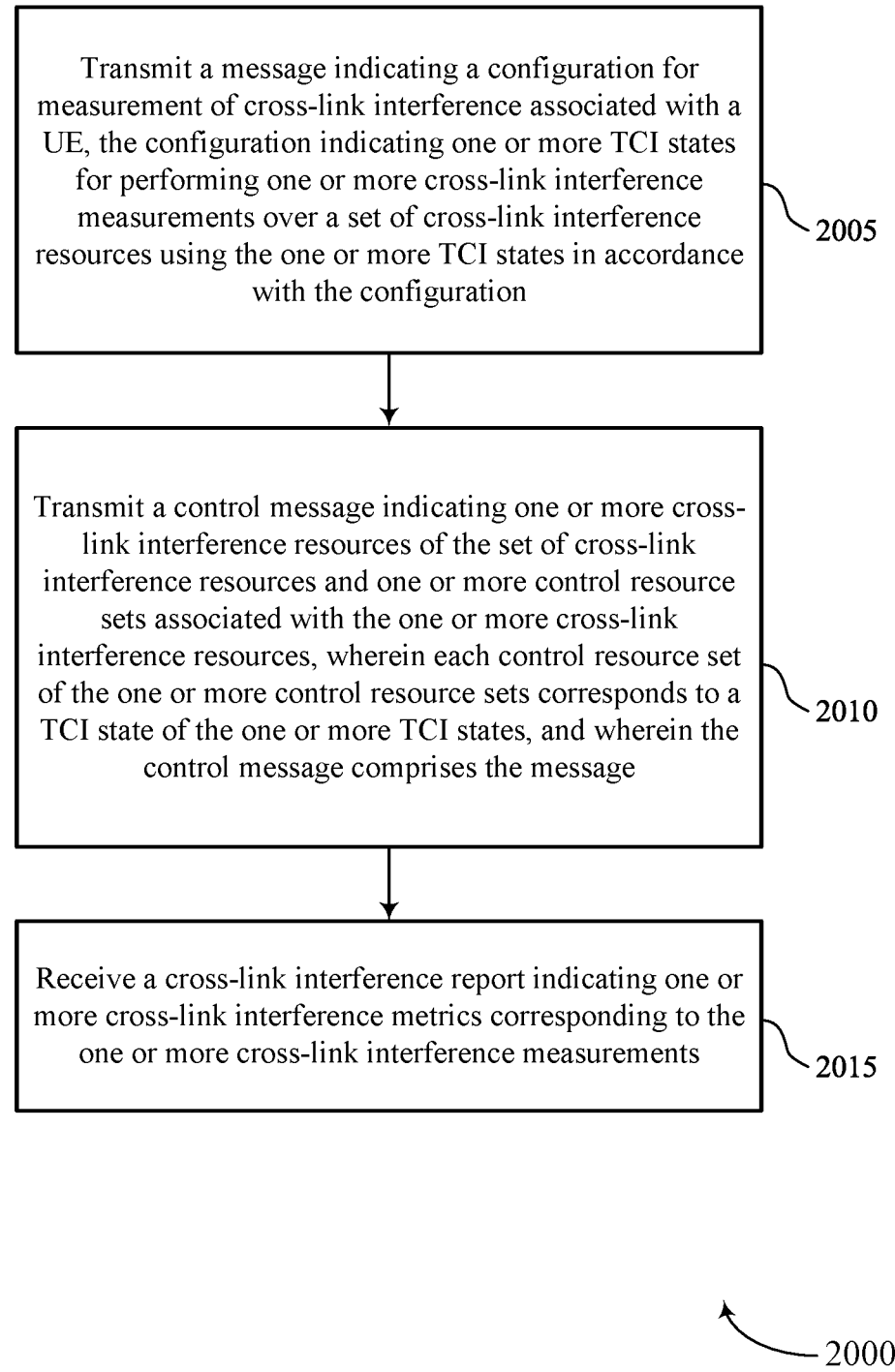

FIG. 20 shows a flowchart illustrating a method 2000 that supports cross-link interference measurement and reporting in a multiple TRP system in accordance with one or more aspects of the present disclosure. The operations of the method 2000 may be implemented by a network entity or its components as described herein. For example, the operations of the method 2000 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2005, the method may include transmitting a message indicating a configuration for measurement of cross-link interference associated with a UE, the configuration indicating one or more TCI states for performing one or more cross-link interference measurements over a set of cross-link interference resources using the one or more TCI states in accordance with the configuration. The operations of 2005 may be performed in accordance with examples as disclosed herein. In some examples, aspects of the operations of 2005 may be performed by a message component 1425 as described with reference to FIG. 14.

At 2010, the method may include transmitting a control message indicating one or more cross-link interference resources of the set of cross-link interference resources and one or more control resource sets associated with the one or more cross-link interference resources, where each control resource set of the one or more control resource sets corresponds to a TCI state of the one or more TCI states, and where the control message includes the message. The operations of 2010 may be performed in accordance with examples as disclosed herein. In some examples, aspects of the operations of 2010 may be performed by a message component 1425 as described with reference to FIG. 14.

At 2015, the method may include receiving a cross-link interference report indicating one or more cross-link interference metrics corresponding to the one or more cross-link interference measurements. The operations of 2015 may be performed in accordance with examples as disclosed herein. In some examples, aspects of the operations of 2015 may be performed by a report component 1430 as described with reference to FIG. 14.

Figure 21:
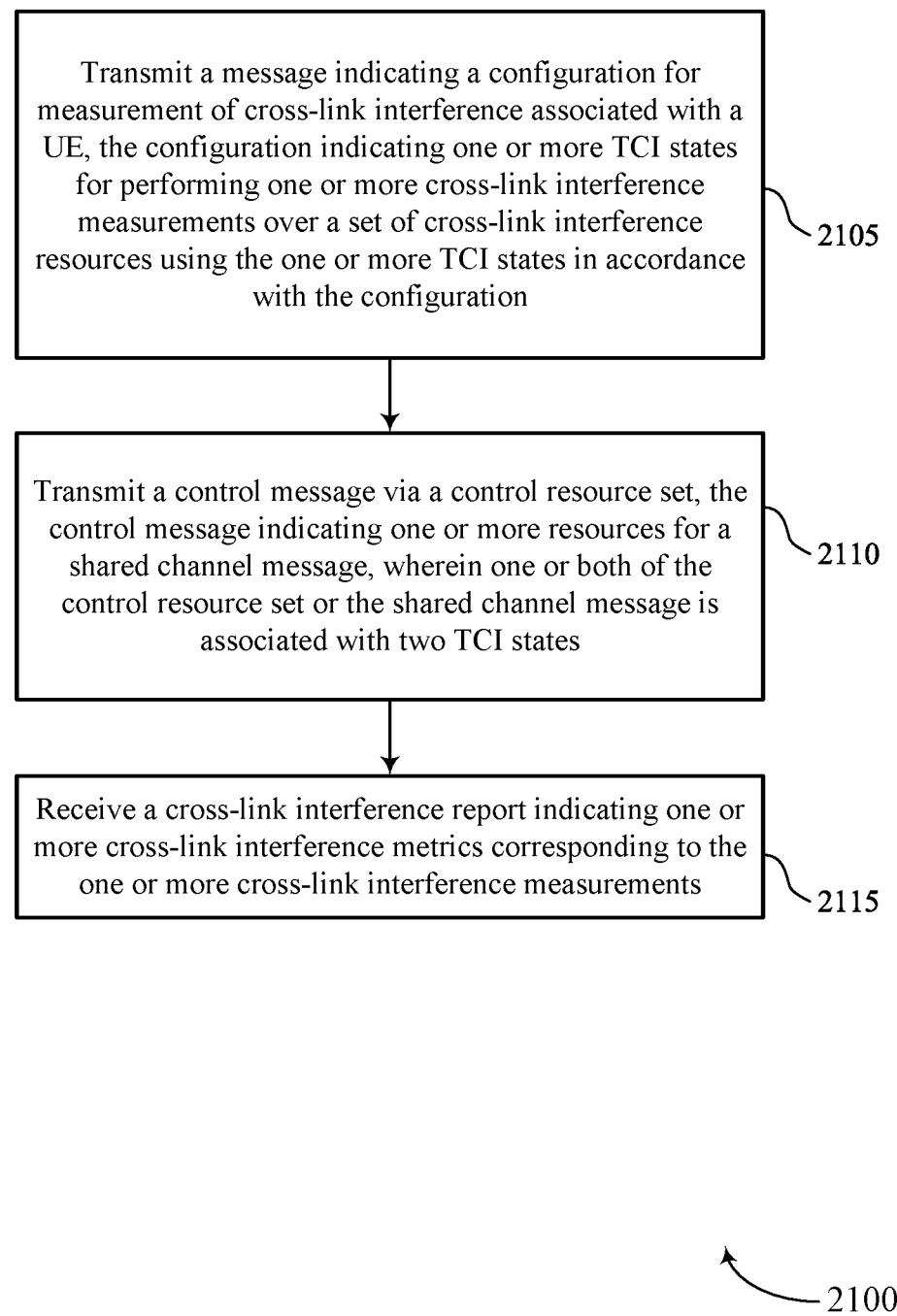

FIG. 21 shows a flowchart illustrating a method 2100 that supports cross-link interference measurement and reporting in a multiple TRP system in accordance with one or more aspects of the present disclosure. The operations of the method 2100 may be implemented by a network entity or its components as described herein. For example, the operations of the method 2100 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2105, the method may include transmitting a message indicating a configuration for measurement of cross-link interference associated with a UE, the configuration indicating one or more TCI states for performing one or more cross-link interference measurements over a set of cross-link interference resources using the one or more TCI states in accordance with the configuration. The operations of 2105 may be performed in accordance with examples as disclosed herein. In some examples, aspects of the operations of 2105 may be performed by a message component 1425 as described with reference to FIG. 14.

At 2110, the method may include transmitting a control message via a control resource set, the control message indicating one or more resources for a shared channel message, where one or both of the control resource set or the shared channel message is associated with two TCI states. The operations of 2110 may be performed in accordance with examples as disclosed herein. In some examples, aspects of the operations of 2110 may be performed by a message component 1425 as described with reference to FIG. 14.

At 2115, the method may include receiving a cross-link interference report indicating one or more cross-link interference metrics corresponding to the one or more cross-link interference measurements. The operations of 2115 may be performed in accordance with examples as disclosed herein. In some examples, aspects of the operations of 2115 may be performed by a report component 1430 as described with reference to FIG. 14.

The following provides an overview of aspects of the present disclosure:

Aspect 1: A method for wireless communication at a UE, comprising: receiving a message indicating a configuration for measurement of cross-link interference associated with the UE, the configuration indicating one or more TCI states for the UE to use for performing one or more cross-link interference measurements; performing the one or more cross-link interference measurements over a set of cross-link interference resources using the one or more TCI states in accordance with the configuration; and transmitting a cross-link interference report indicating one or more cross-link interference metrics corresponding to the one or more cross-link interference measurements.

Aspect 2: The method of aspect 1, wherein receiving the message indicating the configuration for the measurement of the cross-link interference comprises: receiving a control message indicating one or more cross-link interference resources of the set of cross-link interference resources and one or more control resource sets associated with the one or more cross-link interference resources, wherein each control resource set of the one or more control resource sets corresponds to a TCI state of the one or more TCI states, and wherein the control message comprises the message.

Aspect 3: The method of aspect 1, wherein receiving the message indicating the configuration for the measurement of the cross-link interference comprises: receiving a control message via a control resource set, the control message indicating one or more resources for a shared channel message for the UE, wherein one or both of the control resource set or the shared channel message is associated with two TCI states, and wherein the one or more cross-link interference measurements are performed based at least in part on at least one TCI state of the two TCI states.

Aspect 4: The method of aspect 3, wherein performing the one or more cross-link interference measurements comprises: performing the one or more cross-link interference measurements based at least in part on a single quasi co-location relationship associated with the at least one TCI state of the two TCI states.

Aspect 5: The method of aspect 3, wherein performing the one or more cross-link interference measurements comprises: performing the one or more cross-link interference measurements based at least in part on a quasi co-location relationship associated with a TCI state of the at least one TCI state, the TCI state corresponding to a lowest TCI state identifier or a highest TCI state identifier of the at least one TCI state.

Aspect 6: The method of aspect 3, wherein performing the one or more cross-link interference measurements comprises: performing a first one or more cross-link interference measurements based at least in part on a first quasi co-location relationship associated with a first TCI state of the at least one TCI state over a first one or more cross-link interference resources of the set of cross-link interference resources and a second one or more cross-link interference measurements based at least in part on a second quasi co-location relationship associated with a second TCI state of the at least one TCI state over a second one or more cross-link interference resources of the set of cross-link interference resources.

Aspect 7: The method of aspect 3, wherein performing the one or more cross-link interference measurements comprises: performing the one or more cross-link interference measurements based at least in part on two quasi co-location relationships, wherein each of the two quasi co-location relationships are associated with a respective one of the at least one TCI state of the two TCI states.

Aspect 8: The method of any of aspects 1 through 7, wherein the configuration comprises an indication of one or more time offsets for performing the one or more cross-link interference measurements, the one or more time offsets being associated with the one or more TCI states.

Aspect 9: The method of aspect 8, wherein the one or more time offsets are associated with two TCI states of the one or more TCI states, and the one or more time offsets comprise a metric based at least in part on a maximum timing advance value, a minimum timing advanced value, or an average timing advance value.

Aspect 10: The method of aspect 1, wherein performing the one or more cross-link interference measurements comprises: performing the one or more cross-link interference measurements based at least in part on a first quasi co-location relationship associated with a first TCI state of the one or more TCI states and a second TCI state of the one or more TCI states, wherein the first TCI state corresponds to a first beam and the second TCI state corresponds to a second beam; and generating a single cross-link interference metric based at least in part on the one or more cross-link interference measurements, wherein the cross-link interference report indicates the single cross-link interference metric.

Aspect 11: The method of aspect 1, wherein performing the one or more cross-link interference measurements comprises: performing a first one or more cross-link interference measurements over a first one or more cross-link interference resources of the set of cross-link interference resources based at least in part on a first quasi co-location relationship associated with a first TCI state of the one or more TCI states and a second one or more cross-link interference measurements over a second one or more cross-link interference resources of the set of cross-link interference resources based at least in part on a second quasi co-location relationship associated with a second TCI state of the one or more TCI states, wherein the first TCI state corresponds to a first beam and the second TCI state corresponds to a second beam, and wherein the first one or more cross-link interference measurements and the second one or more cross-link interference measurements are each performed with both the first beam and the second beam; and generating a first two cross-link interference metrics based at least in part on the first one or more cross-link interference measurements and a second two cross-link interference metrics based at least in part on the second one or more cross-link interference measurements, wherein one of the first two cross-link interference metrics and one of the second two cross-link interference metrics correspond to the first beam and the second beam.

Aspect 12: The method of aspect 11, wherein transmitting the cross-link interference report comprises: transmitting the cross-link interference report, wherein the cross-link interference report indicates one of the first two cross-link interference metrics and one of the second two cross-link interference metrics, both of the first two cross-link interference metrics and both of the second two cross-link interference metrics, an average of one of the first two cross-link interference metrics and one of the second two cross-link interference metrics, or an average of the first two cross-link interference metrics and the second two cross-link interference metrics.

Aspect 13: The method of any of aspects 11 through 12, further comprising: comparing each of the first two cross-link interference metrics and each of the second two cross-link interference metrics to a threshold; and dropping a first one of the first two cross-link interference metrics and a first one of the second two cross-link interference metrics based at least in part on determining that the first one of the first two cross-link interference metrics and the first one of the second two cross-link interference metrics fail to satisfy the threshold, wherein the cross-link interference report indicates a second one of the first two cross-link interference metrics and a second one of the second two cross-link interference metrics or an average of the second one of the first two cross-link interference metrics and the second one of the second two cross-link interference metrics.

Aspect 14: The method of aspect 13, further comprising: determining an order of the first two cross-link interference metrics and the second two cross-link interference metrics based at least in part on a TCI state order of the first TCI state and the second TCI state, a control resource set order associated with each of the first TCI state and the second TCI state, or a value corresponding to each of the first two cross-link interference metrics and each of the second two cross-link interference metrics, wherein the cross-link interference report comprises an indication of the order.

Aspect 15: The method of aspect 11, wherein transmitting the cross-link interference report comprises: filtering the first two cross-link interference metrics and the second two cross-link interference metrics; and transmitting the cross-link interference report, wherein the cross-link interference report indicates the first two cross-link interference metrics, the second two cross-link interference metrics, a linear average of the first two cross-link interference metrics and the second two cross-link interference metrics, a filtered average of the first two cross-link interference metrics and the second two cross-link interference metrics, or both a linear average and filtered average of the first two cross-link interference metrics and the second two cross-link interference metrics.

Aspect 16: The method of aspect 15, wherein the cross-link interference report indicates the first two cross-link interference metrics based at least in part on a value associated with the first two cross-link interference metrics being greater than a value associated with the second two cross-link interference metrics.

Aspect 17: The method of any of aspects 15 through 16, wherein filtering the first two cross-link interference metrics and the second two cross-link interference metrics comprises: filtering the first two cross-link interference metrics and the second two cross-link interference metrics using a first filtering coefficient for the first two cross-link interference metrics and a second filtering coefficient for the second two cross-link interference metrics or a third filtering coefficient for both the first two cross-link interference metrics and the second two cross-link interference metrics.

Aspect 18: The method of any of aspects 1 through 17, further comprising: transmitting an indication of a UE capability associated with performing the one or more cross-link interference measurements, wherein the set of cross-link interference resources is based at least in part on the UE capability.

Aspect 19: A method for wireless communication at a network entity, comprising: transmitting a message indicating a configuration for measurement of cross-link interference associated with a UE, the configuration indicating one or more TCI states for performing one or more cross-link interference measurements over a set of cross-link interference resources using the one or more TCI states in accordance with the configuration; and receiving a cross-link interference report indicating one or more cross-link interference metrics corresponding to the one or more cross-link interference measurements.

Aspect 20: The method of aspect 19, wherein transmitting the message indicating the configuration for the measurement of the cross-link interference comprises: transmitting a control message indicating one or more cross-link interference resources of the set of cross-link interference resources and one or more control resource sets associated with the one or more cross-link interference resources, wherein each control resource set of the one or more control resource sets corresponds to a TCI state of the one or more TCI states, and wherein the control message comprises the message.

Aspect 21: The method of aspect 19, wherein transmitting the message indicating the configuration for the measurement of the cross-link interference comprises: transmitting a control message via a control resource set, the control message indicating one or more resources for a shared channel message, wherein one or both of the control resource set or the shared channel message is associated with two TCI states.

Aspect 22: The method of any of aspects 19 through 21, wherein the configuration comprises an indication of one or more time offsets for performing the one or more cross-link interference measurements, the one or more time offsets being associated with the one or more TCI states.

Aspect 23: The method of aspect 22, wherein the one or more time offsets are associated with two TCI states of the one or more TCI states, and the one or more time offsets comprise a metric based at least in part on a maximum timing advance value, a minimum timing advanced value, or an average timing advance value.

Aspect 24: The method of any of aspects 19 through 23, wherein receiving the cross-link interference report comprises: receiving the cross-link interference report, wherein the cross-link interference report indicates at least one of a first two cross-link interference metrics based at least in part on a first one or more cross-link interference measurements and a second two cross-link interference metrics based at least in part on a second one or more cross-link interference measurements, the first one or more cross-link interference measurements are associated with a first TCI state of the one or more TCI states and the second one or more cross-link interference measurements are associated with a second TCI state of the one or more TCI states, wherein the first TCI state corresponds to a first beam and the second TCI state corresponds to a second beam, and wherein the first one or more cross-link interference measurements and the second one or more cross-link interference measurements are based at least in part on both the first beam and the second beam.

Aspect 25: The method of aspect 24, wherein the cross-link interference report indicates one of the first two cross-link interference metrics and one of the second two cross-link interference metrics, both of the first two cross-link interference metrics and both of the second two cross-link interference metrics, an average of one of the first two cross-link interference metrics and one of the second two cross-link interference metrics, or an average of the first two cross-link interference metrics and the second two cross-link interference metrics.

Aspect 26: The method of aspect 24, wherein the cross-link interference report indicates the first two cross-link interference metrics, the second two cross-link interference metrics, a linear average of the first two cross-link interference metrics and the second two cross-link interference metrics, a filtered average of the first two cross-link interference metrics and the second two cross-link interference metrics, or both a linear average and filtered average of the first two cross-link interference metrics and the second two cross-link interference metrics.

Aspect 27: The method of aspect 26, wherein the cross-link interference report indicates the first two cross-link interference metrics based at least in part on a value associated with the first two cross-link interference metrics being greater than a value associated with the second two cross-link interference metrics.

Aspect 28: The method of any of aspects 19 through 27, further comprising: receiving an indication of a UE capability associated with performing the one or more cross-link interference measurements, wherein the set of cross-link interference resources is based at least in part on the UE capability.

Aspect 29: An apparatus for wireless communication at a UE, comprising a processor; memory coupled with the processor; and instructions stored in the memory and executable by the processor to cause the apparatus to perform a method of any of aspects 1 through 18.

Aspect 30: An apparatus for wireless communication at a UE, comprising at least one means for performing a method of any of aspects 1 through 18.

Aspect 31: A non-transitory computer-readable medium storing code for wireless communication at a UE, the code comprising instructions executable by a processor to perform a method of any of aspects 1 through 18.

Aspect 32: An apparatus for wireless communication at a network entity, comprising a processor; memory coupled with the processor; and instructions stored in the memory and executable by the processor to cause the apparatus to perform a method of any of aspects 19 through 28.

Aspect 33: An apparatus for wireless communication at a network entity, comprising at least one means for performing a method of any of aspects 19 through 28.

Aspect 34: A non-transitory computer-readable medium storing code for wireless communication at a network entity, the code comprising instructions executable by a processor to perform a method of any of aspects 19 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, via a plurality of receive beams, a plurality of downlink signals, the plurality of receive beams comprising a first receive beam associated with a first transmission configuration indicator state and a second receive beam associated with a second transmission configuration indicator state;
   receiving a message indicating a configuration for measurement of cross-link interference associated with the plurality of downlink signals, the configuration indicating to use the first transmission configuration indicator state and the second transmission configuration indicator state, to perform one or more cross-link interference measurements;
   performing the one or more cross-link interference measurements over a set of cross-link interference resources using the first transmission configuration indicator state and the second transmission configuration indicator state in accordance with the configuration; and
   transmitting a cross-link interference report indicating one or more cross-link interference metrics corresponding to the one or more cross-link interference measurements.

2. The method of claim 1, wherein receiving the message indicating the configuration for the measurement of the cross-link interference comprises:
   receiving a control message indicating one or more cross-link interference resources of the set of cross-link interference resources and one or more control resource sets associated with the one or more cross-link interference resources, wherein each control resource set of the one or more control resource sets corresponds to the first transmission configuration indicator state or the second transmission configuration indicator state, or both, and wherein the control message comprises the message.

3. The method of claim 1, wherein receiving the message indicating the configuration for the measurement of the cross-link interference comprises:
   receiving a control message via a control resource set, the control message indicating one or more resources for a shared channel message for the UE, wherein one or both of the control resource set or the shared channel message is associated with two transmission configuration indicator states, and wherein the one or more cross-link interference measurements are performed based at least in part on at least one transmission configuration indicator state of the two transmission configuration indicator states, wherein the two transmission configuration indicator states comprise the first transmission configuration indicator state and the second transmission configuration indicator state.

4. The method of claim 3, wherein performing the one or more cross-link interference measurements comprises:
   performing a first cross-link interference measurement of the one or more cross-link interference measurements based at least in part on a single quasi co-location relationship associated with the first transmission configuration indicator state or the second transmission configuration indicator state.

5. The method of claim 3, wherein performing the one or more cross-link interference measurements comprises:
   performing a first cross-link interference measurement of the one or more cross-link interference measurements based at least in part on a quasi co-location relationship associated with a transmission configuration indicator state of the first transmission configuration indicator state and the second transmission configuration indicator state that corresponds to a lowest transmission configuration indicator state identifier or a highest transmission configuration indicator state identifier.

6. The method of claim 3, wherein performing the one or more cross-link interference measurements comprises:
   performing a first one or more cross-link interference measurements based at least in part on a first quasi co-location relationship associated with the first transmission configuration indicator state over a first one or more cross-link interference resources of the set of cross-link interference resources and a second one or more cross-link interference measurements based at least in part on a second quasi co-location relationship associated with the second transmission configuration indicator state over a second one or more cross-link interference resources of the set of cross-link interference resources.

7. The method of claim 3, wherein performing the one or more cross-link interference measurements comprises:
   performing the one or more cross-link interference measurements based at least in part on two quasi co-location relationships, wherein each of the two quasi co-location relationships are associated with a respective one of the two transmission configuration indicator states.

8. The method of claim 1, wherein the configuration comprises an indication of one or more time offsets for performing the one or more cross-link interference measurements, the one or more time offsets being associated with the first transmission configuration indicator state or the second transmission configuration indicator state, or both.

9. The method of claim 8, wherein the one or more time offsets are associated with the first transmission configuration indicator state and the second transmission configuration indicator state, and the one or more time offsets comprise a metric based at least in part on a maximum timing advance value, a minimum timing advanced value, or an average timing advance value.

10. The method of claim 1, wherein performing the one or more cross-link interference measurements comprises:
    performing the one or more cross-link interference measurements based at least in part on a first quasi co-location relationship associated with the first transmission configuration indicator state and the second transmission configuration indicator state; and
    generating a single cross-link interference metric based at least in part on the one or more cross-link interference measurements, wherein the cross-link interference report indicates the single cross-link interference metric.

11. The method of claim 1, wherein performing the one or more cross-link interference measurements comprises:
    performing a first one or more cross-link interference measurements over a first one or more cross-link interference resources of the set of cross-link interference resources based at least in part on a first quasi co-location relationship associated with the first transmission configuration indicator state and a second one or more cross-link interference measurements over a second one or more cross-link interference resources of the set of cross-link interference resources based at least in part on a second quasi co-location relationship associated with the second transmission configuration indicator state, wherein the first one or more cross-link interference measurements and the second one or more cross-link interference measurements are each performed with both the first receive beam and the second receive beam; and generating a first two cross-link interference metrics based at least in part on the first one or more cross-link interference measurements and a second two cross-link interference metrics based at least in part on the second one or more cross-link interference measurements, wherein one of the first two cross-link interference metrics and one of the second two cross-link interference metrics correspond to the first receive beam and the second receive beam.

12. The method of claim 11, wherein transmitting the cross-link interference report comprises:
transmitting the cross-link interference report, wherein the cross-link interference report indicates one of the first two cross-link interference metrics and one of the second two cross-link interference metrics, both of the first two cross-link interference metrics and both of the second two cross-link interference metrics, an average of one of the first two cross-link interference metrics and one of the second two cross-link interference metrics, or an average of the first two cross-link interference metrics and the second two cross-link interference metrics.

13. The method of claim 11, further comprising:
comparing each of the first two cross-link interference metrics and each of the second two cross-link interference metrics to a threshold; and
dropping a first one of the first two cross-link interference metrics and a first one of the second two cross-link interference metrics based at least in part on the first one of the first two cross-link interference metrics and the first one of the second two cross-link interference metrics failing to satisfy the threshold, wherein the cross-link interference report indicates a second one of the first two cross-link interference metrics and a second one of the second two cross-link interference metrics or an average of the second one of the first two cross-link interference metrics and the second one of the second two cross-link interference metrics.

14. The method of claim 13, further comprising:
determining an order of the first two cross-link interference metrics and the second two cross-link interference metrics based at least in part on a transmission configuration indicator state order of the first transmission configuration indicator state and the second transmission configuration indicator state, a control resource set order associated with each of the first transmission configuration indicator state and the second transmission configuration indicator state, or a value corresponding to each of the first two cross-link interference metrics and each of the second two cross-link interference metrics, wherein the cross-link interference report comprises an indication of the order.

15. The method of claim 11, wherein transmitting the cross-link interference report comprises:
filtering the first two cross-link interference metrics and the second two cross-link interference metrics; and
transmitting the cross-link interference report, wherein the cross-link interference report indicates the first two cross-link interference metrics, the second two cross-link interference metrics, a linear average of the first two cross-link interference metrics and the second two cross-link interference metrics, a filtered average of the first two cross-link interference metrics and the second two cross-link interference metrics, or both a linear average and filtered average of the first two cross-link interference metrics and the second two cross-link interference metrics.

16. The method of claim 15, wherein the cross-link interference report indicates the first two cross-link interference metrics based at least in part on a value associated with the first two cross-link interference metrics being greater than a value associated with the second two cross-link interference metrics.

17. The method of claim 15, wherein filtering the first two cross-link interference metrics and the second two cross-link interference metrics comprises:
filtering the first two cross-link interference metrics and the second two cross-link interference metrics using a first filtering coefficient for the first two cross-link interference metrics and a second filtering coefficient for the second two cross-link interference metrics or a third filtering coefficient for both the first two cross-link interference metrics and the second two cross-link interference metrics.

18. The method of claim 1, further comprising:
transmitting an indication of a UE capability associated with performing the one or more cross-link interference measurements, wherein the set of cross-link interference resources is based at least in part on the UE capability.

19. A method for wireless communication at a network entity, comprising:
transmitting one or more downlink signals to a user equipment (UE) via a first beam, wherein the network entity is a first transmission and reception point (TRP) of a plurality of TRPs associated with a plurality of downlink signals for the UE;
transmitting a message indicating a configuration for measurement of cross-link interference associated with the plurality of downlink signals for the UE, the configuration indicating the UE is to use a first transmission configuration indicator state associated with the first beam corresponding to the first TRP and a second transmission configuration indicator state associated with a second beam corresponding to a second TRP of the plurality of TRPs to perform one or more cross-link interference measurements over a set of cross-link interference resources; and
receiving a cross-link interference report indicating one or more cross-link interference metrics corresponding to the one or more cross-link interference measurements indicated in the configuration.

20. The method of claim 19, wherein transmitting the message indicating the configuration for the measurement of the cross-link interference comprises:
transmitting a control message indicating one or more cross-link interference resources of the set of cross-link interference resources and one or more control resource sets associated with the one or more cross-link interference resources, wherein each control resource set of the one or more control resource sets corresponds to the first transmission configuration indicator state or the second transmission configuration indicator state, or both, and wherein the control message comprises the message.

21. The method of claim 19, wherein transmitting the message indicating the configuration for the measurement of the cross-link interference comprises:

transmitting a control message via a control resource set, the control message indicating one or more resources for a shared channel message, wherein one or both of the control resource set or the shared channel message is associated with two transmission configuration indicator states, wherein the two transmission configuration indicator states comprise the first transmission configuration indicator state and the second transmission configuration indicator state.

22. The method of claim 19, wherein the configuration comprises an indication of one or more time offsets for performing the one or more cross-link interference measurements, the one or more time offsets being associated with the first transmission configuration indicator state or the second transmission configuration indicator state, or both.

23. The method of claim 22, wherein the one or more time offsets are associated with the first transmission configuration indicator state and the second transmission configuration indicator state, and the one or more time offsets comprise a metric based at least in part on a maximum timing advance value, a minimum timing advanced value, or an average timing advance value.

24. The method of claim 19, wherein receiving the cross-link interference report comprises:
receiving the cross-link interference report, wherein the cross-link interference report indicates at least one of a first two cross-link interference metrics based at least in part on a first one or more cross-link interference measurements and a second two cross-link interference metrics based at least in part on a second one or more cross-link interference measurements, the first one or more cross-link interference measurements are associated with the first transmission configuration indicator state and the second one or more cross-link interference measurements are associated with the second transmission configuration indicator state, wherein the first one or more cross-link interference measurements and the second one or more cross-link interference measurements are based at least in part on both the first beam and the second beam.

25. The method of claim 24, wherein the cross-link interference report indicates one of the first two cross-link interference metrics and one of the second two cross-link interference metrics, both of the first two cross-link interference metrics and both of the second two cross-link interference metrics, an average of one of the first two cross-link interference metrics and one of the second two cross-link interference metrics, or an average of the first two cross-link interference metrics and the second two cross-link interference metrics.

26. The method of claim 24, wherein the cross-link interference report indicates the first two cross-link interference metrics, the second two cross-link interference metrics, a linear average of the first two cross-link interference metrics and the second two cross-link interference metrics, a filtered average of the first two cross-link interference metrics and the second two cross-link interference metrics, or both a linear average and filtered average of the first two cross-link interference metrics and the second two cross-link interference metrics.

27. The method of claim 26, wherein the cross-link interference report indicates the first two cross-link interference metrics based at least in part on a value associated with the first two cross-link interference metrics being greater than a value associated with the second two cross-link interference metrics.

28. The method of claim 19, further comprising:
receiving an indication of a UE capability associated with performing the one or more cross-link interference measurements, wherein the set of cross-link interference resources is based at least in part on the UE capability.

29. An apparatus for wireless communication at a user equipment (UE), comprising:
a processor;
memory coupled with the processor; and
instructions stored in the memory and executable by the processor to cause the apparatus to:
receive, via a plurality of receive beams, a plurality of downlink signals, the plurality of receive beams comprising a first receive beam associated with a first transmission configuration indicator state and a second receive beam associated with a second transmission configuration indicator state;
receive a message indicating a configuration for measurement of cross-link interference associated with the plurality of downlink signals, the configuration indicating to use the first transmission configuration indicator state and the second transmission configuration indicator state to perform one or more cross-link interference measurements;
perform the one or more cross-link interference measurements over a set of cross-link interference resources using the first transmission configuration indicator state and the second transmission configuration indicator state in accordance with the configuration; and
transmit a cross-link interference report indicating one or more cross-link interference metrics corresponding to the one or more cross-link interference measurements.

30. An apparatus for wireless communication at a network entity, comprising:
a processor;
memory coupled with the processor; and
instructions stored in the memory and executable by the processor to cause the apparatus to:
transmit one or more downlink signals to a user equipment (UE) via a first beam, wherein the network entity is a first transmission and reception point (TRP) of a plurality of TRPs associated with a plurality of downlink signals for the UE;
transmit a message indicating a configuration for measurement of cross-link interference associated with the plurality of downlink signals for the UE, the configuration indicating the UE is to use a first transmission configuration indicator state associated with the first beam corresponding to the first TRP and a second transmission configuration indicator state associated with a second beam corresponding to a second TRP of the plurality of TRPs to perform, one or more cross-link interference measurements over a set of cross-link interference resources; and
receive a cross-link interference report indicating one or more cross-link interference metrics corresponding to the one or more cross-link interference measurements indicated in the configuration.

* * * * *